US012755682B1

(12) United States Patent
Jin et al.

(10) Patent No.: US 12,755,682 B1
(45) Date of Patent: Oct. 6, 2026

(54) DRIVE CIRCUIT AND METHOD, SCANNING CIRCUIT AND METHOD, AND DISPLAY DEVICE

(71) Applicant: Wuhan Tianma MicroElectronics Co., Ltd. Shanghai Branch., Shanghai (CN)

(72) Inventors: Ye Jin, Shanghai (CN); Nana Xiong, Shanghai (CN)

(73) Assignee: Wuhan Tianma MicroElectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 19/311,333

(22) Filed: Aug. 27, 2025

(30) Foreign Application Priority Data

Jun. 30, 2025 (CN) ......................... 202510900833.1

(51) Int. Cl.
*G09G 3/32* (2016.01)

(52) U.S. Cl.
CPC ....... *G09G 3/32* (2013.01); *G09G 2310/0267* (2013.01); *G09G 2310/0286* (2013.01); *G09G 2320/043* (2013.01); *G09G 2330/021* (2013.01)

(58) Field of Classification Search
CPC ............. G09G 3/32; G09G 2310/0267; G09G 2310/0286; G09G 2320/043; G09G 2330/021
See application file for complete search history.

(56) References Cited

U.S. PATENT DOCUMENTS

| | | | | |
|---|---|---|---|---|
| 11,380,265 B2 * | 7/2022 | Park | ..................... | G09G 3/3233 |
| 2017/0140697 A1 * | 5/2017 | In | ......................... | G09G 3/2092 |
| 2021/0233483 A1 * | 7/2021 | Huang | ..................... | G09G 3/36 |

* cited by examiner

*Primary Examiner* — Chanh D Nguyen
*Assistant Examiner* — Jarurat Suteerawongsa
(74) *Attorney, Agent, or Firm* — Anova Law Group, PLLC

(57) ABSTRACT

Drive circuit and method, scanning circuit and method, and display device are provided. The drive circuit includes a shift register sub-circuit and an output sub-circuit. The shift register sub-circuit outputs a first level from a first level terminal based on an effective level of a second control clock signal, outputs an ineffective level of a first control clock signal based on effective levels of a third control clock signal and a turn-on control signal and subsequently outputs an effective level of the first control clock signal. The output sub-circuit outputs the first level based on the effective level of the first control clock signal output by the shift register sub-circuit, and outputs a second level based on an effective level of an interval clock signal.

24 Claims, 18 Drawing Sheets

DRIVE CIRCUIT AND METHOD, SCANNING CIRCUIT AND METHOD, AND DISPLAY DEVICE

CROSS-REFERENCE TO RELATED APPLICATION

This application claims priority of Chinese Patent Application No.: 202510900833.1, filed on Jun. 30, 2025, the entire contents of which are hereby incorporated by reference.

FIELD OF THE DISCLOSURE

The present disclosure generally relates to the field of display driving technology and, more particularly, relates to a drive circuit and method, a scanning circuit and method, and a display device.

BACKGROUND

With the advancement of electronic technology, display devices have been widely applied in numerous fields and electronic products and have become indispensable in daily life and work. Examples include televisions, mobile phones, computers, personal digital assistants, and the like. A display device generally includes drive circuits, scanning circuits, pixel circuits, fingerprint recognition circuits, and the like components. A pixel circuit is configured to provide a corresponding drive current to the light-emitting element. A fingerprint recognition circuit is configured to collect and identify fingerprint information. A drive circuit is configured to provide a corresponding drive signal to a pixel circuit or a fingerprint recognition circuit within a same group. The scanning circuits connect the drive circuits in cascade to provide drive signals for pixel circuits or fingerprint circuits that belong to different groups based on predetermined timing. The performance of the circuits directly affects an overall performance of the display device. As an important component of the display device, the scanning circuit is a key area of focus for a person skilled in the art.

BRIEF SUMMARY OF THE DISCLOSURE

One aspect of the present disclosure provides a drive circuit. The drive circuit includes a shift register sub-circuit and an output sub-circuit. The shift register sub-circuit includes a first control terminal connected to a first control clock signal, a second control terminal connected to a second control clock signal, a third control terminal connected to a third control clock signal, an opening control terminal connected to an opening control signal, a first input terminal electrically connected to a first level terminal, and a second input terminal electrically connected to a second level terminal. The shift register sub-circuit is configured to output a first level from the first level terminal based on an effective level of the second control clock signal, output an ineffective level of the first control clock signal based on effective levels of the third control clock signal and a turn-on control signal, and subsequently output an effective level of the first control clock signal. A phase of the first level and a phase of the second level from the second level terminal are opposite, and a phase of the effective level of the first control clock signal is identical to the phase of the second level. The output sub-circuit includes a first control terminal electrically connected to an output terminal of the shift register sub-circuit, a second control terminal connected to an interval clock signal, a first input terminal electrically connected to the first level terminal, and a second input terminal electrically connected to the second level terminal. The output sub-circuit is configured to output the first level based on the effective level of the first control clock signal output by the shift register sub-circuit and output the second level based on an effective level of the interval clock signal. Effective levels of the second control clock signal, the third control clock signal, the first control clock signal, and the interval control clock signal are arranged sequentially in time within a driving cycle of the drive circuit.

Another aspect of the present disclosure provides a driving method for driving the drive circuit. A driving cycle of the driving method includes, in time sequence, a reset phase, a start phase, an output phase and an end phase. In the reset phase, the shift register sub-circuit outputs the first level from the first level terminal based on the effective level of the second control clock signal, and the output sub-circuit outputs the second level from the second level terminal. In the turn-on phase, the shift register sub-circuit outputs the ineffective level of the first control clock signal based on the third control clock signal and the effective level of the turn-on control signal, and the output sub-circuit outputs the second level. In the output phase, the shift register sub-circuit outputs the effective level of the first control clock signal, and the output sub-circuit outputs the first level based on the effective level of the first control clock signal output by the shift register sub-circuit. In the end phase, the shift register sub-circuit outputs the ineffective level of the first control clock signal, and the output sub-circuit outputs the second level based on the effective level of the interval clock signal.

Another aspect of the present disclosure provides a scanning circuit. The scanning circuit includes a plurality of cascaded drive circuits, each of which is the drive circuit described above.

Another aspect of the present disclosure provides a scanning method used in the scanning circuit. The scanning method includes controlling a plurality of cascaded drive circuits to sequentially output a first level. A time interval between outputs of the first level from two adjacent drive circuits includes an effective level duration of an interval clock signal connected to the drive circuit of a preceding phase.

Another aspect of the present disclosure provides a display device including the scanning circuit.

Other aspects of the present disclosure can be understood by a person skilled in the art in light of the description, the claims, and accompanying drawings of the present disclosure.

BRIEF DESCRIPTION OF THE DRAWINGS

To more clearly explain the embodiments of the present disclosure or technical solutions in the related art, the accompanying drawings are provided and briefly introduced below. The accompanying drawings are merely illustrative examples of the embodiments of the present disclosure. Based on the accompanying drawings, other drawings can be obtained by a person skilled in the art without creative efforts.

DETAILED DESCRIPTION

Technical solutions in the embodiments of the present disclosure are described clearly and completely below with reference to the accompanying drawings. The embodiments described herein represent only some rather than all embodiments of the present disclosure. Based on the embodiments, all other embodiments derived by a person skilled in the art without creative efforts fall within the protection scope of the present disclosure.

As mentioned in the background section, with the advancement of electronic technology, display devices have been widely applied in numerous fields and electronic products and have become indispensable in daily life and work. Examples include televisions, mobile phones, computers, personal digital assistants, and the like. In general, a display device includes drive circuits, scanning circuits, pixel circuits, fingerprint recognition circuits, and the like. A pixel circuit is configured to provide a corresponding drive current to the light-emitting element. A fingerprint recognition circuit is configured to collect and identify fingerprint information. A drive circuit is configured to provide a corresponding drive signal to a pixel circuit or a fingerprint recognition circuit within a same group. The scanning circuits connect the drive circuits in cascade to provide drive signals for pixel circuits or fingerprint circuits that belong to different groups based on predetermined timing. The quality of the circuits directly affects the performance of the display device. As important components of the display device, the circuits constitute a key area of research for a person skilled in the art.

Based on the above, the embodiments of the present disclosure provide a drive circuit and method, a scanning circuit and method, and a display device, which effectively solve technical problems existing in the art. The drive circuit performs phase conversion control from an effective level of a first control clock signal output by a shift register sub-circuit to a first level output by an output sub-circuit. The drive circuit also controls an end time of the first level output by the output sub-circuit based on an interval clock signal, which enables a pulse width of the output sub-circuit in the drive circuit to be adjusted to output the first level, and allows an interval between adjacent output sub-circuits in the scanning circuit to be adjusted when outputting the first level.

To achieve the above objective, the technical solutions provided by the embodiments of the present disclosure are as follows. The technical solutions are described in detail with reference to FIGS. 1-18.

Figure 1:
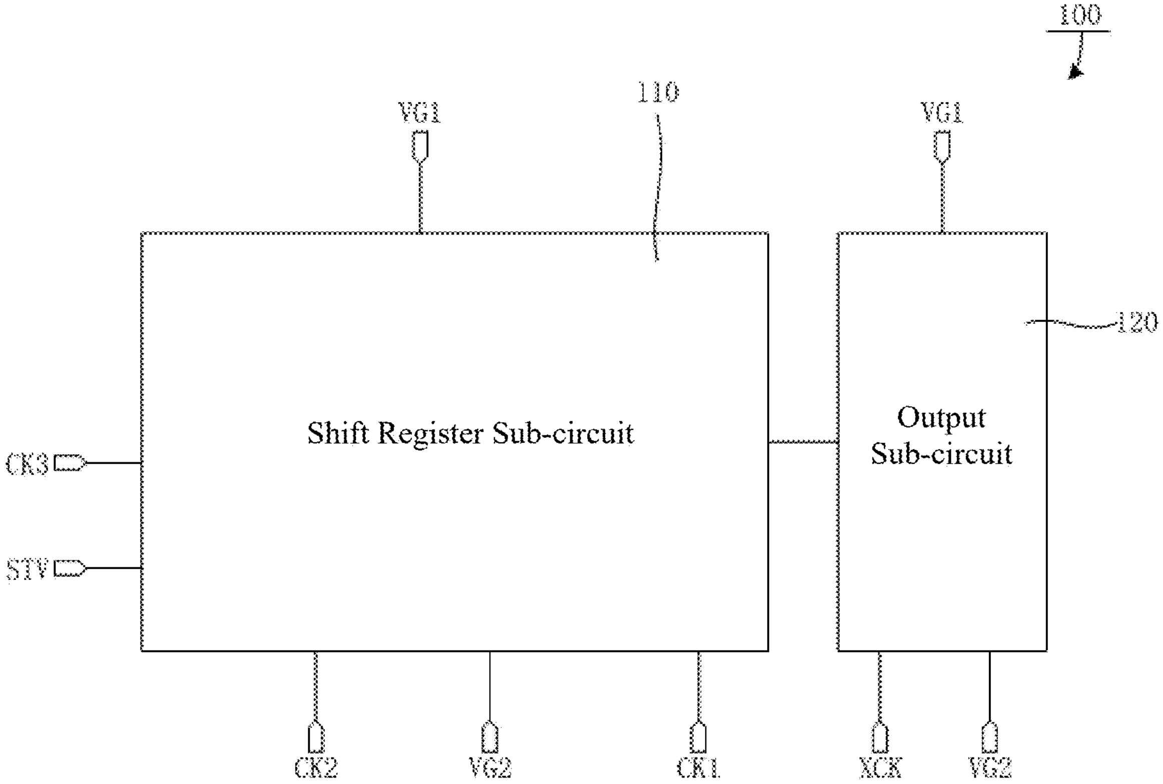
FIG. 1 illustrates a circuit diagram of a drive circuit consistent with various embodiments of the present disclosure.

FIG. 1 illustrates a circuit diagram of a drive circuit consistent with various embodiments of the present disclosure. In one embodiment, a drive circuit 100 includes a shift register sub-circuit 110 and an output sub-circuit 120. A first control terminal of the shift register sub-circuit 110 is connected to a first control clock signal CK1, a second control terminal of the shift register sub-circuit 110 is connected to a second control clock signal CK2, and a third control terminal of the shift register sub-circuit 110 is connected to a third control clock signal CK3. A turn-on control terminal of the shift register sub-circuit 110 is connected to a turn-on control signal STV. A first input terminal of the shift register sub-circuit 110 is electrically connected to a first level terminal VG1, and a second input terminal is electrically connected to a second level terminal VG2. The shift register sub-circuit 110 outputs a first level from the first level terminal VG1 based on an effective level of the second control clock signal CK2. An ineffective level of the first control clock signal CK1 is output based on effective levels of the third control clock signal CK3 and the turn-on control signal STV, followed by the output of an effective level of the first control clock signal CK1. A first level and a second level of the second level terminal VG2 have opposite phases. Effective levels of the first control clock signal CK1, the second control clock signal CK2, the third control clock signal CK3, and an interval clock signal XCK are all in phase with the second level. A first control terminal of the output sub-circuit 120 is electrically connected to an output terminal of the shift register sub-circuit 110, a second control terminal of the output sub-circuit 120 is connected to the interval clock signal. The output sub-circuit 120 outputs a first level based on the effective level of the first control clock signal CK1 output by the shift register sub-circuit 110, and outputs a second level based on an effective level of the interval clock signal XCK. In a driving cycle of the drive circuit 100, effective level edges of the second control clock signal CK2, the third control clock signal CK3, the first control clock signal CK1 and the interval clock signal XCK occur sequentially in time. That is, during the driving cycle of the drive circuit 100, the second control clock signal CK2 reaches the effective level thereof, followed by the third control clock signal CK3, and finally the first control clock signal CK1.

It can be understood that the drive circuit 100 provided by the embodiment realizes phase conversion control from the effective level of the first control clock signal CK1, output by the shift register sub-circuit 110, to the first level output by the output sub-circuit 120. Based on the control of the interval clock signal XCK, the drive circuit 100 also achieves end-time control of the first level output by the output sub-circuit 120. Therefore, by optimizing the interval clock signal XCK, a pulse width of the first level output by the output sub-circuit 120 can be adjusted, and a timing of the first level output by the output sub-circuit 120 of an adjacent drive circuit 100 in the scanning circuit can also be made adjustable. In addition, the technical solution provided in the embodiment improves upon the shift register sub-circuit 110 by adding an output sub-circuit 120 connected to an output of the shift register sub-circuit 110. The above configuration enables the drive circuit 100 to realize desired functions, thereby reducing an overall design complexity of the drive circuit 100. Optionally, in one embodiment, the drive circuit 100 can be used to provide a reset control signal for the fingerprint recognition circuit. Fingerprint recognition requires different exposure times depending on whether a finger is detected, and the time required for data reading also varies accordingly. Therefore, in the embodiment, the drive circuit 100 can realize the function of adjustable pulse width of the first level, and the function of realizing the adjustable interval of the first level output by adjacent drive circuits and can provide an adapted driving signal. The drive circuit 100 can also provide a suitable driving signal for the fingerprint recognition circuit. The application for the drive circuit 100 is not limited to fingerprint recognition circuits. In other embodiments, the drive circuit 100 may also be used to provide relevant driving signals for other circuits, which is not specifically limited herein.

Within a driving cycle of the drive circuit 100, a preset time interval exists between the effective level of the first control clock signal CK1 and the effective level of the interval clock signal XCK. Since the output sub-circuit 120 outputs a first level based on the effective level of the first control clock signal CK1 from the shift register sub-circuit 110, and outputs a second level based on the effective level of the interval clock signal XCK, the drive circuit 100 achieves phase conversion control from the effective level of CK1 to the first level output by the output sub-circuit 120. Based on the control of the interval clock signal XCK, the drive circuit 100 also achieves end-time control of the first level output by the output sub-circuit 120. Therefore, by adjusting a time interval between the effective levels of the first control clock signal CK1 and the interval clock signal XCK, a duration, or pulse width, of the first level output by the output sub-circuit 120 can be controlled.

In one embodiment, a specific circuit configuration and connections of the drive circuit 100 are described in detail below with reference to the accompanying drawings. In the embodiment, all transistors included in the drive circuit 100 are exemplified as P-type transistors. The first level corresponds to a high level, and the second level corresponds to a low level. The effective levels of the first control clock signal CK1, the second control clock signal CK2, the third control clock signal CK3, the interval clock signal XCK, and the start control signal STV are all low level, with the ineffective level being high level. In other embodiments, the transistors included in the drive circuit 100 may all be N-type transistors or may include a combination of P-type and N-type transistors, which is not specifically limited herein. When a transistor is a P-type transistor, an effective level of a control signal connected to a gate of the P-type transistor is a low level and an ineffective level is a high level. Conversely, when the transistor is an N-type transistor, an effective level of a control signal connected to a gate of the N-type transistor is high level and an ineffective level is low level.

Figure 2:
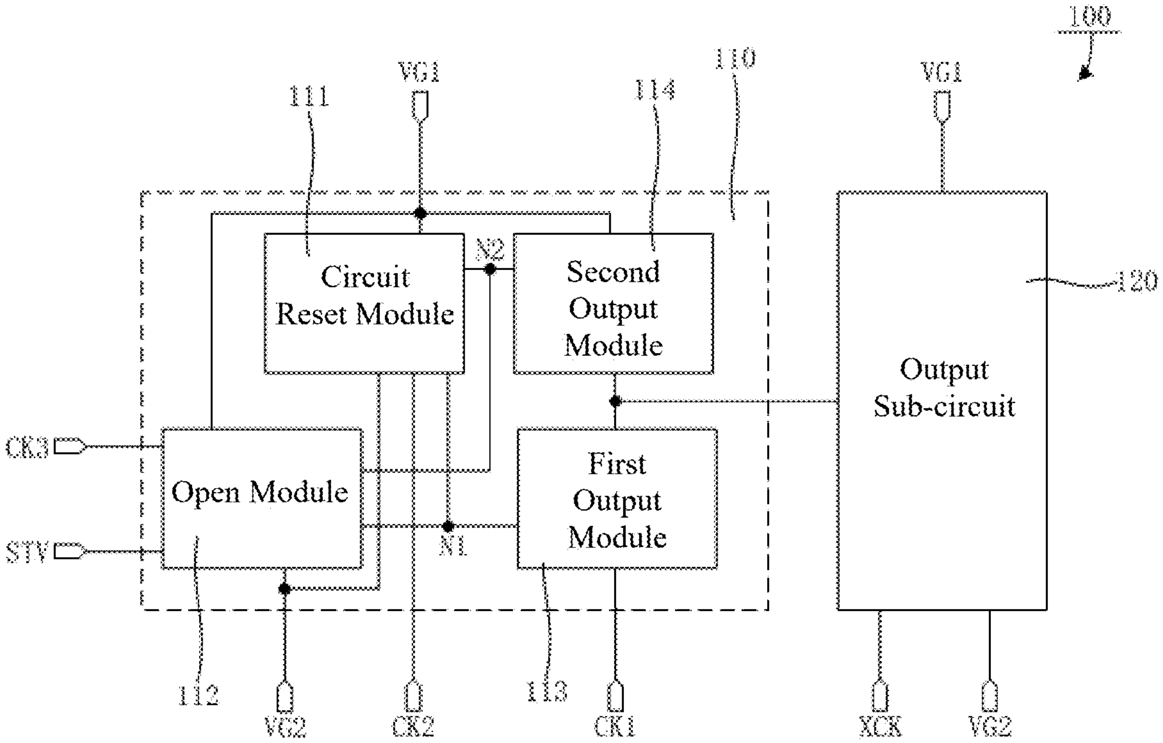
FIG. 2 illustrates a circuit diagram of another drive circuit consistent with various embodiments of the present disclosure.

FIG. 2 illustrates a circuit diagram of another drive circuit consistent with various embodiments of the present disclosure. In one embodiment, a shift register sub-circuit 110 includes: a circuit reset module 111, an opening module 112, a first output module 113 and a second output module 114. Output terminals of the first output module 113 and the second output module 114 serve as an output terminal of the shift register sub-circuit 120, that is, the output terminals of the first output module 113 and the second output module 114 are both electrically connected to the first control terminal of the output sub-circuit 120. The circuit reset module 111 is electrically connected to the second control clock signal CK2, a first node N1 and a second node N2, and a first level terminal VG1 and a second level terminal VG2. The circuit reset module 111 controls a level of the first node N1 to the first level and a level of the second node N2 to the second level based on the effective level of the second control clock signal CK2. That is, the circuit reset module 111 connects the second level terminal VG2 to the second node N2 based on the effective level of the second control clock signal CK2 and connects the first level terminal VG1 to the first node N1 based on the second level of the second node N2. The second output module 114 is electrically connected to the first level terminal VG1 and the second node N2. The second output module 114 outputs the first level based on the second level of the second node N2, that is, the second output module 114 is controlled by the second level of the second node N2 to connect the output terminal of the shift register sub-circuit 110 to the first level terminal VG1.

As shown in FIG. 2, the opening module 112 is connected to the third control clock signal CK3 and the opening control signal STV. The opening module 112 is electrically connected to the first node N1 and the second node N2, the first level terminal VG1, and the second level terminal VG2. The turn-on module 112 controls the level of the first node N1 to be the second level and controls the level of the second node N2 to be the first level based on the effective levels of the third control clock signal CK3 and the turn-on control signal STV. Specifically, the turn-on module 112 connects the second level terminal VG2 to the first node N1 based on the effective levels of the third control clock signal CK3 and the turn-on control signal STV. Based on the effective level of the turn-on control signal STV and the second level of the first node N1, the first level terminal VG1 is connected to the second node N2. The first output module 113 is connected to the first control clock signal CK1 and is electrically connected to the first node N1. The first output module 113 outputs the ineffective level of the first control clock signal CK1 based on the second level of the first node N1 and then outputs the effective level of the first control clock signal CK1. In other words, the first output module 113 transmits the first control clock signal CK1 to the output terminal of the shift register sub-circuit 110 under a control of the second level of the first node N1.

Figure 3:
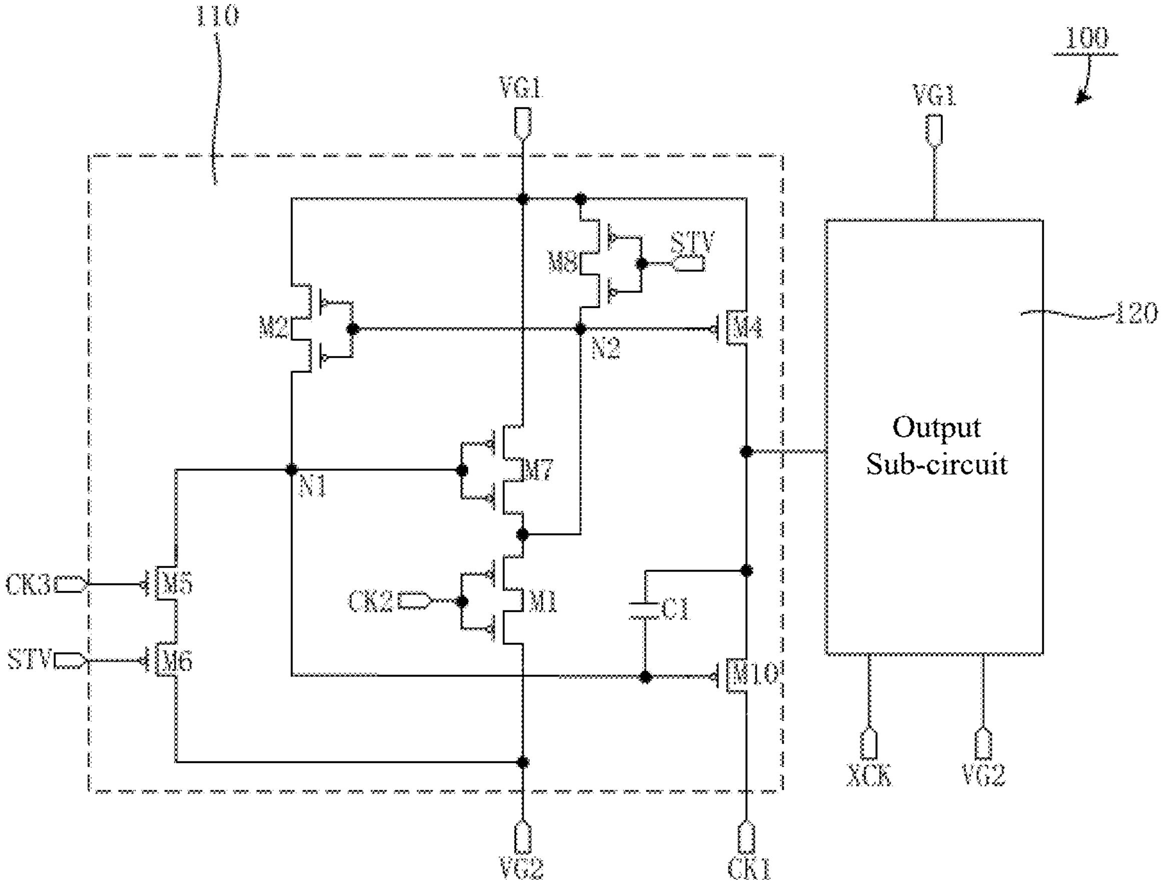
FIG. 3 illustrates a circuit diagram of another drive circuit consistent with various embodiments of the present disclosure.

Further, with reference to FIG. 3, the components and connection relationships included in each module in the shift register sub-circuit 110 provided by the embodiment of the present application will be described. FIG. 3 illustrates a circuit diagram of another drive circuit consistent with various embodiments of the present disclosure. In one embodiment, the circuit reset module 111 includes a first transistor M1 and a second transistor M2. A first terminal of the first transistor M1 is electrically connected to the second level terminal VG2, a second terminal of the first transistor M1 is electrically connected to the second node N2, and a gate of the first transistor M1 is connected to the second control clock signal CK2. The first terminal of the first transistor M1 serves as a second input terminal of the shift register sub-circuit 110, and the gate of the first transistor M1 serves as the second control terminal of the shift register sub-circuit 110. The first transistor M1 is turned on based on the effective level of the second control clock signal CK2, thereby connecting the second level terminal VG2 with the second node N2, so that the level of the second node N2 becomes the second level. A first terminal of the second transistor M2 is electrically connected to the first level terminal VG1, A second terminal of the second transistor M2 is electrically connected to the first node N1. A gate of the second transistor M2 is electrically connected to the second node N2. The first terminal of the second transistor M2 serves as a first input terminal of the shift register sub-circuit 110. The second transistor M2 is turned on based on the second level of the second node N2, thereby connecting the first level terminal VG1 to the first node N1, so that the level of the first node N1 becomes the first level. In some embodiments, at least one of the first transistor M1 and the second transistor M2 may be a dual-gate transistor, which may improve a response speed of the first transistor M1 and the second transistor M2, reduce power consumption and leakage current of the shift register sub-circuit 110, and enhance an overall performance of the drive circuit 100.

As shown in FIG. 3, in one embodiment, the second output module 114 includes a fourth transistor M4. A first terminal of the fourth transistor M4 is electrically connected to the first level terminal VG1, a second terminal of the fourth transistor M4 serves as an output terminal of the second output module 114, and a gate of the fourth transistor M4 is electrically connected to the second node N2. The first terminal of the fourth transistor M4 serves as the first input terminal of the shift register sub-circuit 110, and the second terminal of the fourth transistor M4 serves as the output terminal of the shift register sub-circuit 110. The fourth transistor M4 is controlled to be turned on based on the second level of the second node N2, thereby connecting the output terminal of the shift register sub-circuit 110 to the first level terminal VG1.

As shown in FIG. 3, in one embodiment, the turn-on module 112 includes a fifth transistor M5, a sixth transistor M6, a seventh transistor M7, and an eighth transistor M8. A first terminal of the fifth transistor M5 is electrically connected to a second terminal of the sixth transistor M6, a second terminal of the fifth transistor M5 is electrically connected to the first node N1, and a gate of the fifth transistor M5 is connected to the third control clock signal CK3. A first terminal of the sixth transistor M6 is electrically connected to the second level terminal VG2, and a gate of the sixth transistor M6 is connected to the turn-on control signal STV. A first terminal of the seventh transistor M7 is electrically connected to the first level terminal VG1, a second terminal of the seventh transistor M7 is electrically connected to the second node N2, and a gate of the seventh transistor M7 is electrically connected to the first node N1. A first terminal of the eighth transistor M8 is electrically connected to the first level terminal VG1, a second terminal of the eighth transistor M8 is electrically connected to the second node N2, and a gate of the eighth transistor M8 is connected to the turn-on control signal STV. The gate of the fifth transistor M5 serves as the third control terminal of the shift register sub-circuit 110, and the gate of the sixth transistor M6 and the gate of the eighth transistor M8 are electrically connected and function as the turn-on control terminal of the shift register sub-circuit 110. The fifth transistor M5 is turned on based on the effective level control of the third control clock signal CK3, and simultaneously, the sixth transistor M6 is turned on in response to the effective level of the turn-on control signal STV, thereby electrically connecting the second level terminal VG2 to the first node N1. The seventh transistor M7 is turned on based on the second level of the first node N1, while the eighth transistor M8 is turned on in response to the effective level of the turn-on control signal STV, thereby connecting the first level terminal VG1 to the second node N2. In some embodiments, at least one of the seventh transistor M7 and the eighth transistor M8 may be a double-gate transistor, which may enhance a response speed of these transistors, reduce power consumption and leakage current in the shift register sub-circuit 110, and improve an overall performance of the drive circuit 100.

As shown in FIG. 3, in one embodiment, the first output module 113 includes a tenth transistor M10 and a first capacitor C1. A first terminal of the tenth transistor M10 is connected to the first control clock signal CK1, a second terminal of the tenth transistor M10 serves as an output terminal of the first output module 113, and a gate of the tenth transistor M10 is electrically connected to the first node N1. A first plate of the first capacitor C1 is electrically connected to the gate of the tenth transistor M10, and a second plate of the first capacitor C1 is electrically connected to the second terminal of the tenth transistor M10. The first terminal of the tenth transistor M10 serves as the first control terminal of the shift register sub-circuit 110, and the second terminal of the tenth transistor M10 serves as the output terminal of the shift register sub-circuit 110. The tenth transistor M10 is turned on based on the second level of the first node N1, thereby transmitting the first control clock signal CK1 to the output terminal of the shift register sub-circuit 110.

Figure 4:
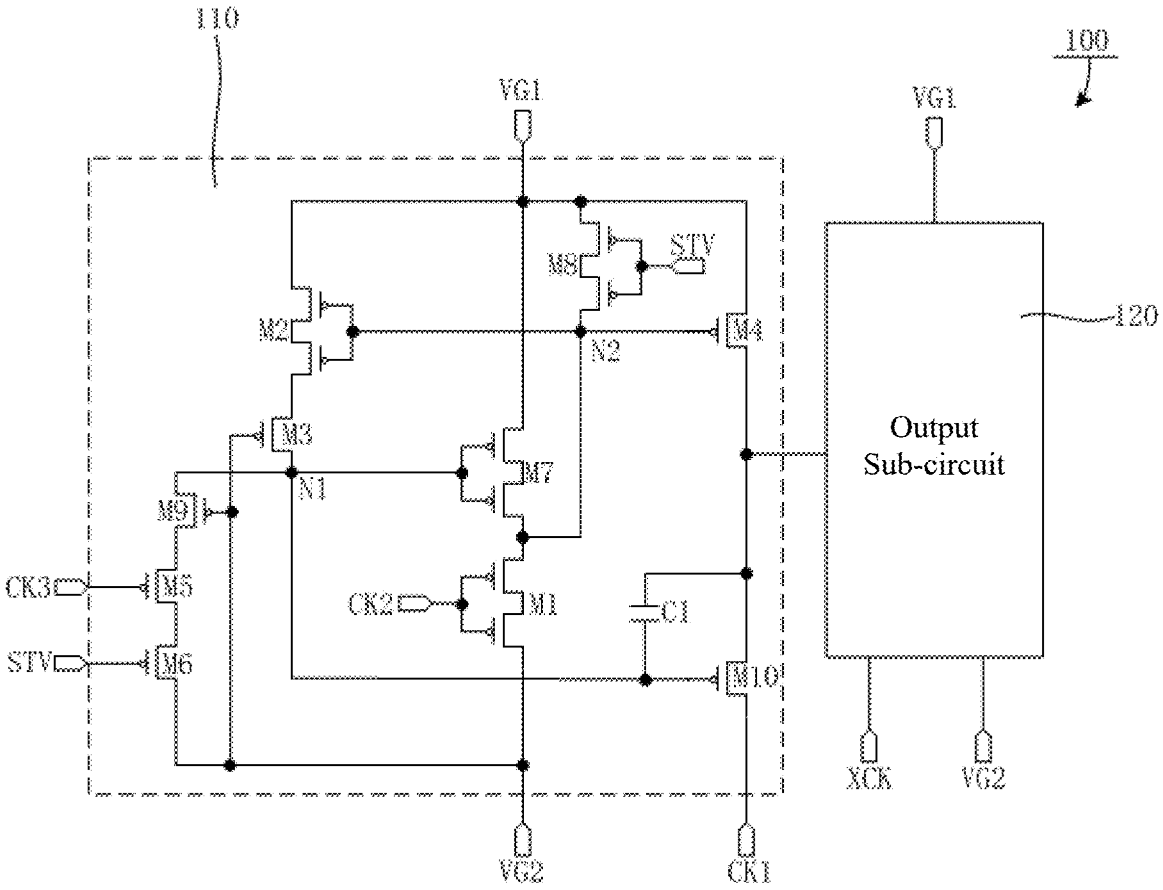
FIG. 4 illustrates a circuit diagram of another drive circuit consistent with various embodiments of the present disclosure.

FIG. 4 illustrates a circuit diagram of another drive circuit consistent with various embodiments of the present disclosure. In one embodiment, the circuit reset module 111 further includes a third transistor M3, which is connected in series between the second transistor M2 and the first node N1. A first terminal of the third transistor M3 is electrically connected to the second terminal of the second transistor M2. A second terminal of the third transistor M3 is electrically connected to the first node N1. A gate of the third transistor M3 is electrically connected to the second level terminal VG2. The gate of the third transistor M3 serves as the second input terminal of the shift register sub-circuit 110. Since the gate of the third transistor M3 is connected to the second level of the second level terminal VG2, the third transistor M3 remains in a normally-on state after the drive circuit 100 is powered on. The above configuration enables the third transistor M3 to divide a voltage across a branch in which the second transistor M2 is located, thereby enhancing both safety and performance of the drive circuit 100. In one embodiment, the turn-on module 112 further includes a ninth transistor M9, which is connected in series between the fifth transistor M5 and the first node N1. A first terminal of the ninth transistor M9 is electrically connected to the first terminal of the fifth transistor M5. A second terminal of the ninth transistor M9 is electrically connected to the first node N1, and a gate of the ninth transistor M9 is electrically connected to the second level terminal VG2. The gate of the ninth transistor M9 serves as the second input terminal of the shift register sub-circuit 110. Since the gate of the ninth transistor M9 is connected to the second level of the second level terminal VG2, the ninth transistor M9 remains in a normally-on state after the drive circuit 100 is powered on. The above configuration enables the ninth transistor M9 to divide a voltage across the branch containing the fifth transistor M5 and the sixth transistor M6, thereby further enhancing the safety and performance of the drive circuit 100.

Figure 5:
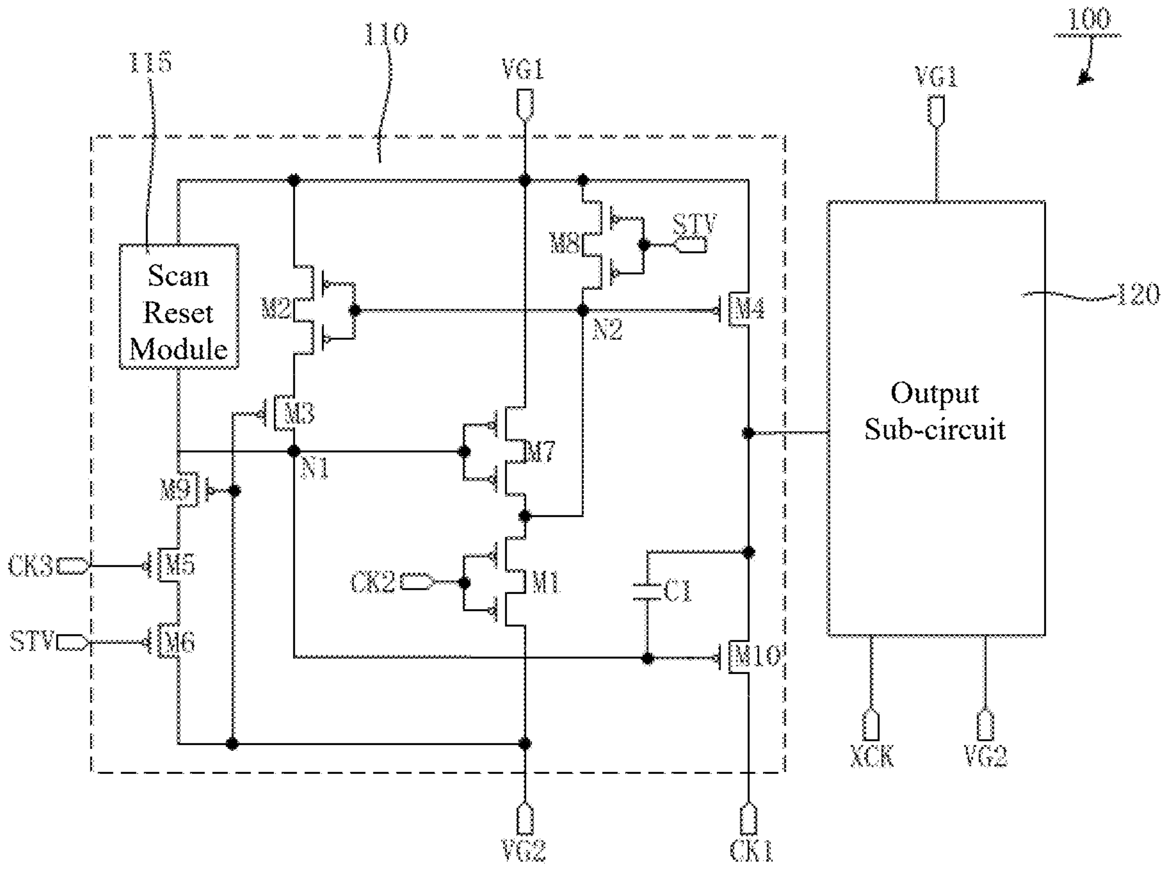
FIG. 5 illustrates a circuit diagram of another drive circuit consistent with various embodiments of the present disclosure.

FIG. 5 illustrates a circuit diagram of another drive circuit consistent with various embodiments of the present disclosure. In one embodiment, the shift register sub-circuit 110 also includes: a scan reset module 115, which is connected to a reset control signal QST, and is electrically connected to the first level terminal VG1. The scan reset module 115 controls the level of the first node N1 to be the first level based on an effective level of the reset control signal QST. Specifically, the scan reset module 115 connects the first level terminal VG1 to the first node N1 when the reset control signal QST is at the effective level. Optionally, within a driving cycle of the drive circuit 100, the effective level of the reset control signal QST precedes the effective level of the second control clock signal CK2, thereby resetting the first node N1 ahead of an operation of the circuit reset module 111, preventing residual signals at a node during subsequent operations and enhancing an overall performance of the drive circuit 100. Alternatively, within a driving cycle of the drive circuit 100, the effective level of the reset control signal QST may begin earlier than the effective level of the second control clock signal CK2. The effective level of the reset control signal QST partially overlaps the effective level of the second control clock signal CK2 in time sequence, thereby ensuring that the scan reset module 115 to reset the first node N1 before the circuit reset module 111 is activated. The above timing arrangement prevents residual signals from remaining at the node during subsequent operations of the driving circuit 100, thereby enhancing an overall performance and reliability of the circuit. Alternatively, within a driving cycle of the drive circuit 100, the effective level of the reset control signal QST overlaps the effective level of the second control clock signal CK2 in time sequence, which is not specifically limited herein. A timing design of the reset control signal QST and the second control clock signal CK2 should be tailored according to actual application requirements.

It should be noted that when the drive circuit 100 is applied in a scanning circuit, where the scanning circuit includes a plurality of cascaded drive circuits 100, the timing of the reset control signal QST is configured relative to the second control clock signal CK2 of the first-phase drive circuit 100. Specifically, during at least one scanning period (i.e., the time required to scan all cascaded drive circuits), the effective level of the reset control signal QST precedes the effective level of the corresponding second control clock signal CK2 in a first-phase drive circuit 100. Alternatively, the effective level of the reset control signal QST may begin earlier than the effective level of the second control clock signal CK2 in the first-phase drive circuit 100, and the effective level of the reset control signal QST partially overlaps the effective level of the corresponding second control clock signal CK2 in the first-phase drive circuit 100 in time sequence. Alternatively, the effective level of the reset control signal QST overlaps the effective level of the second control clock signal CK2 in the first-phase drive circuit 100 in time sequence, so that the first node N1 of all drive circuits 100 is reset in at least one scan cycle, thereby preventing residual signals at the node during subsequent operations of the drive circuit 100 and enhancing an overall performance of the drive circuit 100.

Figure 6:
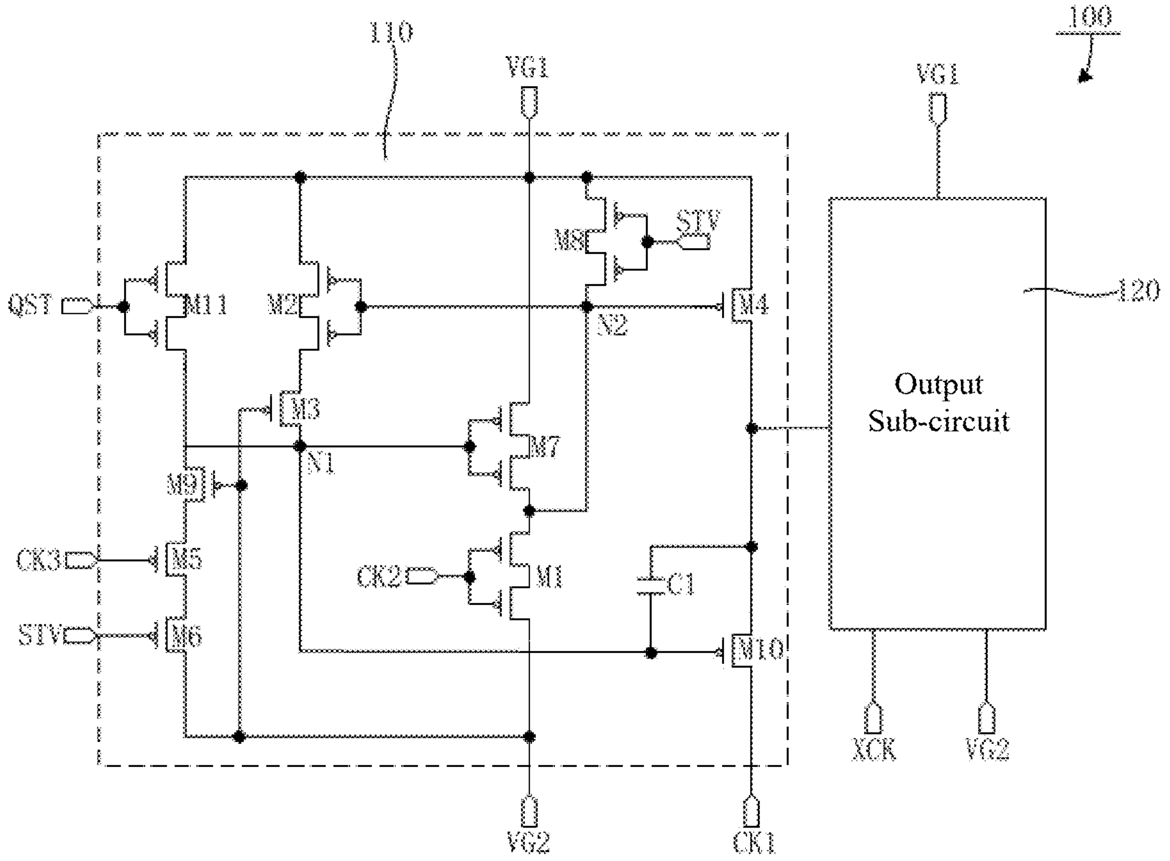
FIG. 6 illustrates a circuit diagram of another drive circuit consistent with various embodiments of the present disclosure.

FIG. 6 illustrates a circuit diagram of another drive circuit consistent with various embodiments of the present disclosure. In one embodiment, the scan reset module 115 may include an eleventh transistor M11. A first terminal of the eleventh transistor M11 is electrically connected to the first level terminal VG1, a second terminal of the eleventh transistor M11 is electrically connected to the first node N1 and a gate of the eleventh transistor M11 is connected to the reset control signal QST. The eleventh transistor M11 is turned on in response to the effective level control of the reset control signal QST, thereby connecting the first level terminal VG1 to the first node N1 to reset the first node N1 to the first level. In some embodiments, the eleventh transistor M11 may be a double-gate transistor, which can improve a response speed of the eleventh transistor M11, reduce power consumption and leakage current of the shift register sub-circuit 110, and enhance an overall performance of the drive circuit 100.

Figure 7:
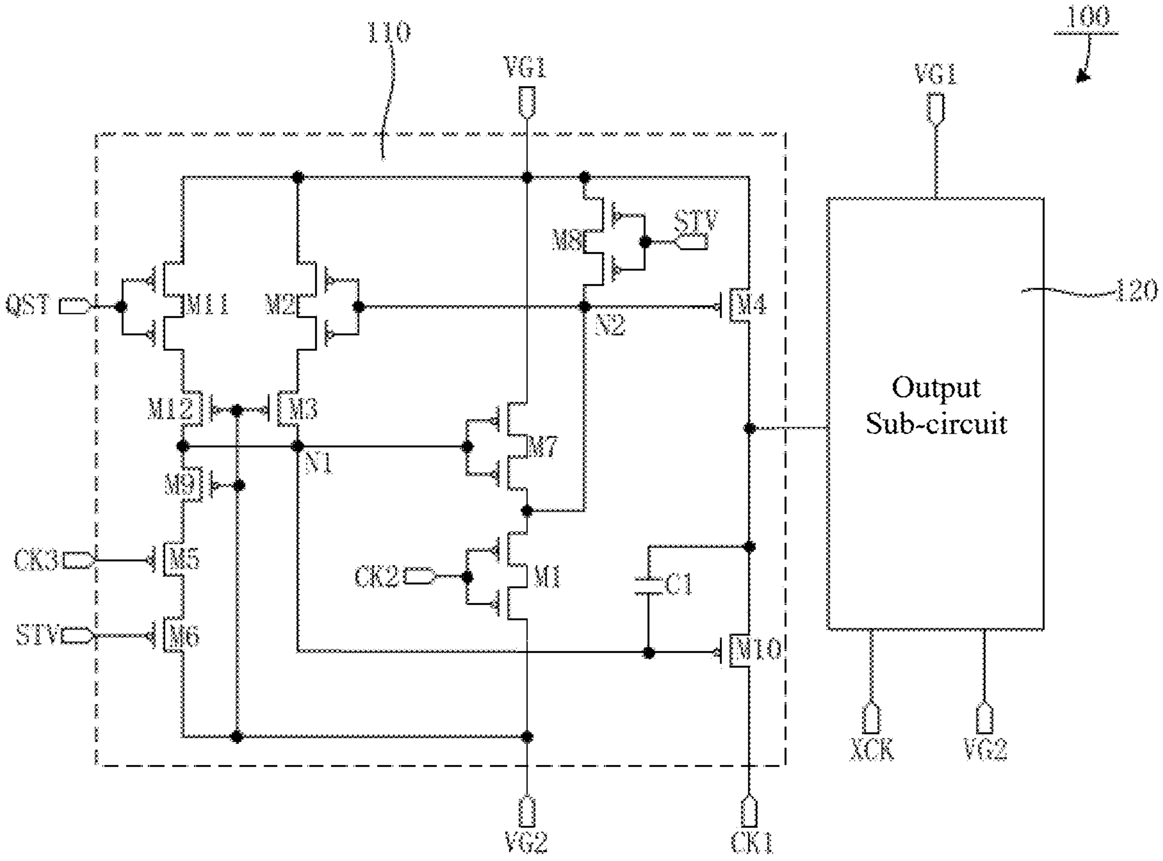
FIG. 7 illustrates a circuit diagram of another drive circuit consistent with various embodiments of the present disclosure.

FIG. 7 illustrates a circuit diagram of another drive circuit consistent with various embodiments of the present disclosure. In one embodiment, the scan reset module 115 also includes a twelfth transistor M12, which is connected in series between the eleventh transistor M11 and the first node N1. A first terminal of the twelfth transistor M12 is electrically connected to the second terminal of the eleventh transistor M11, a second terminal of the twelfth transistor M12 is electrically connected to the first node N1, and a gate of the twelfth transistor M12 is electrically connected to the second level terminal VG2. Since the gate of the twelfth transistor M12 is connected to the second level of the second level terminal VG2, the twelfth transistor M12 remains in a normally-on state after the drive circuit 100 is powered on. The twelfth transistor M12 divides a voltage in a branch containing the eleventh transistor M11, thereby further enhancing the safety and performance of the drive circuit 100.

FIGS. 3-7 primarily illustrate the circuit configuration and connection relationships of the shift register sub-circuit 110. The present disclosure is not limited to the shift register sub-circuit 110 shown in FIGS. 3-7, which represent only some of the shift register sub-circuits 110 applicable to the present disclosure. In other embodiments, the shift register sub-circuit 110 may also include additional applicable circuit components and connection relationships, which should be designed according to specific application requirements. The circuit configuration and connection relationships of the output sub-circuit 120 are described in detail below with reference to the accompanying drawings. However, the present disclosure is not limited to the specific circuit configuration and connection relationships of the output sub-circuit 120 illustrated herein. In other embodiments, the output sub-circuit 120 may also include other applicable circuit configurations and connection relationships.

Figure 8:
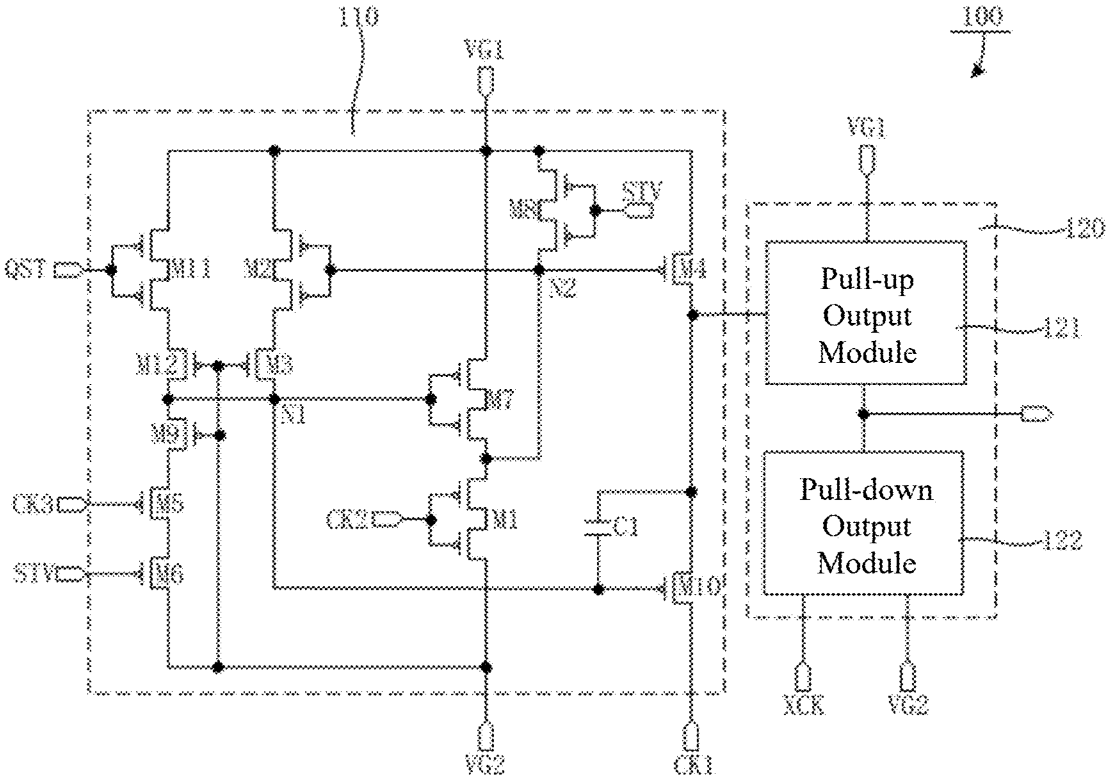
FIG. 8 illustrates a circuit diagram of another drive circuit consistent with various embodiments of the present disclosure.

FIG. 8 illustrates a circuit diagram of another drive circuit consistent with various embodiments of the present disclosure. In one embodiment, the output sub-circuit 120 includes a pull-up output module 121 and a pull-down output module 122. Output terminals of the pull-up output module 121 and the pull-down output module 122 serve as output terminals of the output sub-circuit 120. The pull-up output module 121 is electrically connected to the output terminal of the shift register sub-circuit 110 and the first level terminal VG1. The pull-up output module 121 outputs the first level based on the effective level of the first control clock signal CK1 received from the shift register sub-circuit 110. That is, the pull-up output module 121 connects the first level terminal VG1 to the output terminal of the output sub-circuit 120 based on the effective level control of the first control clock signal CK1 output by the shift register sub-circuit 110. The above arrangement realizes phase conversion control from the effective level of the first control clock signal CK1 output by the shift register sub-circuit 110 to the first level output by the output sub-circuit 120. The pull-down output module 122 is connected to the interval clock signal XCK, and the pull-down output module 122 is electrically connected to the second level terminal VG2. The pull-down output module 122 outputs the second level based on the effective level of the interval clock signal XCK. In other words, the pull-down output module 122 connects the second level terminal VG2 to the output terminal of the output sub-circuit 120 under a control of the effective level of the interval clock signal XCK, thereby achieving end-time control of the first level output by the output sub-circuit 120.

Figure 9:
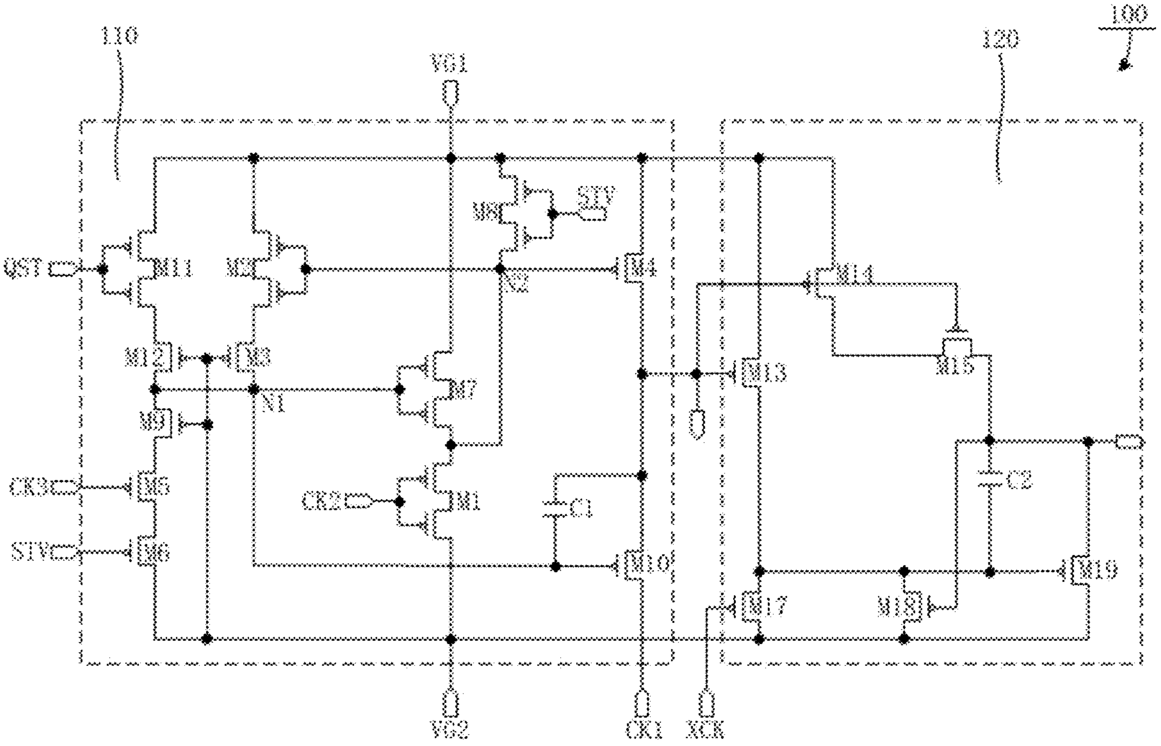
FIG. 9 illustrates a circuit diagram of another drive circuit consistent with various embodiments of the present disclosure.

FIG. 9 illustrates a circuit diagram of another drive circuit consistent with various embodiments of the present disclosure. In one embodiment, the pull-up output module 121 includes a thirteenth transistor M13, a fourteenth transistor M14, and a fifteenth transistor M15. A first terminal of the thirteenth transistor M13 is electrically connected to the first level terminal VG1, a second terminal of the thirteenth transistor M13 is electrically connected to the pull-down output module 122 to control the pull-down output module 122 to stop working, and a gate of the thirteenth transistor M13 is electrically connected to the output terminal of the shift register sub-circuit 110. A first terminal of the fourteenth transistor M14 is electrically connected to the first level terminal VG1, a second terminal of the fourteenth transistor M14 is electrically connected to a first terminal of the fifteenth transistor M15, and a gate of the fourteenth transistor M14 is electrically connected to the output terminal of the shift register sub-circuit 110. A second terminal of the fifteenth transistor M15 is the output terminal of the pull-up output module 121, and a gate of the fifteenth transistor M15 is electrically connected to the output terminal of the shift register sub-circuit 110. The gates of the thirteenth transistor M13, the fourteenth transistor M14 and the fifteenth transistor M15 are electrically connected as the first control terminal of the output sub-module 120. Similarly, the first terminal of the thirteenth transistor M13 and the first terminal of the fourteenth transistor M14 are electrically connected as the first input terminal of the output sub-module 120. The output terminal of the pull-up output module 121 serves as the output terminal of the output sub-module 120. The thirteenth transistor M13, the fourteenth transistor M14, and the fifteenth transistor M15 are turned on under a control of the effective level of the first control clock signal CK1 output by the shift register sub-circuit 110, thereby connecting the first level terminal VG1 to the output terminal of the output sub-module 120, so that the output sub-module 120 outputs the first level.

As shown in FIG. 9, the pull-down output module 122 includes a seventeenth transistor M17, an eighteenth transistor M18, a nineteenth transistor M19 and a second capacitor C2. A first terminal of the seventeenth transistor M17 is electrically connected to the second level terminal VG2, a second terminal of the seventeenth transistor M17 is electrically connected to both a second terminal of the eighteenth transistor M18 and a gate of the nineteenth transistor M19, and a gate of the seventeenth transistor M17 is connected to the interval clock signal XCK. A first terminal of the eighteenth transistor M18 is electrically connected to the second level terminal VG2, and a gate of the eighteenth transistor M18 is electrically connected to a second terminal of the nineteenth transistor M19. A first terminal of the nineteenth transistor M19 is electrically connected to the second level terminal VG2. The second terminal of the nineteenth transistor M19 serves as an output terminal of the pull-down output module 122. A first plate of the second capacitor C2 is electrically connected to the gate of the nineteenth transistor M19, and a second plate of the second capacitor C2 is electrically connected to the second terminal of the nineteenth transistor M19. The gate of the seventeenth transistor M17 serves as the second control terminal of the output sub-module 120. The first terminal of the seventeenth transistor M17, the first terminal of the eighteenth transistor M18 and the first terminal of the nineteenth transistor M19 are electrically connected and collectively form the second input terminal of the output sub-module 120. The output terminal of the pull-down output module 122 also serves as the output terminal of the output sub-module 120. The seventeenth transistor M17 is turned on under a control of the effective level of the interval clock signal, thereby connecting the second level terminal VG2 to the gate of the nineteenth transistor M19. As a result, the nineteenth transistor M19 is turned on, establishing a conduction path between the second level terminal VG2 and the output terminal of the output sub-module 120, so that the output sub-module 120 outputs the second level.

Figure 10:
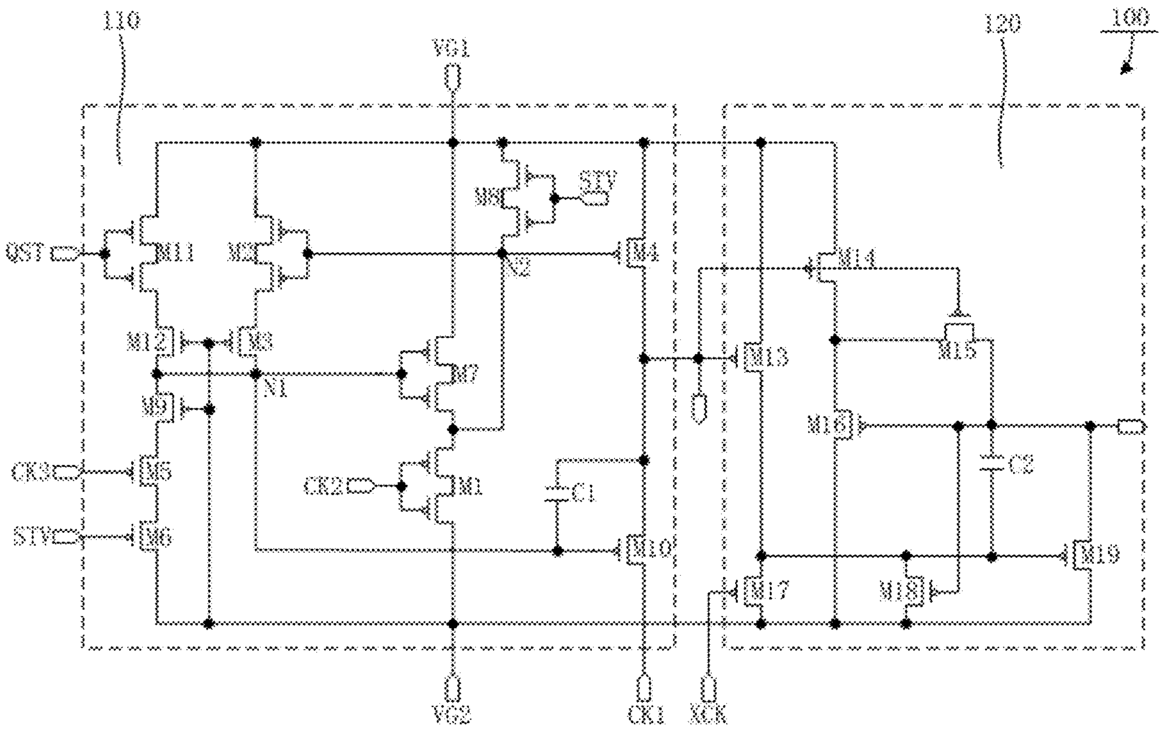
FIG. 10 illustrates a circuit diagram of another drive circuit consistent with various embodiments of the present disclosure.

FIG. 10 illustrates a circuit diagram of another drive circuit consistent with various embodiments of the present disclosure. In one embodiment, the pull-up output module 121 further includes a sixteenth transistor M16. A first terminal of the sixteenth transistor M16 is electrically connected to the second terminal of the fourteenth transistor M14, a second terminal of the sixteenth transistor M16 is electrically connected to the second level terminal VG2, and a gate of the sixteenth transistor M16 is electrically connected to the second terminal of the fifteenth transistor M15. The sixteenth transistor M16 helps mitigate a leakage issue of the fourteenth transistor M14, thereby enhancing reliability of the drive circuit 100. Specifically, when the output level of the output sub-circuit 120 transitions from the first level to the second level, a large voltage difference is generated. When the output terminal of the output sub-circuit 120 outputs the second level, a significant cross-voltage exists between the output terminal and the first level terminal VG1. As a result, the fourteenth transistor M14 becomes susceptible to leakage after prolonged operation of the drive circuit 100. The gate of the sixteenth transistor M16 is electrically connected to the second terminal of the fifteenth transistor M15, that is, to the output terminal of the output sub-circuit 120. When the output terminal of the output sub-circuit 120 outputs the second level, the sixteenth transistor M16 is turned on, thereby suppressing a leakage current of the fourteenth transistor M14 and enhancing an overall reliability of the drive circuit 100.

Figure 11:
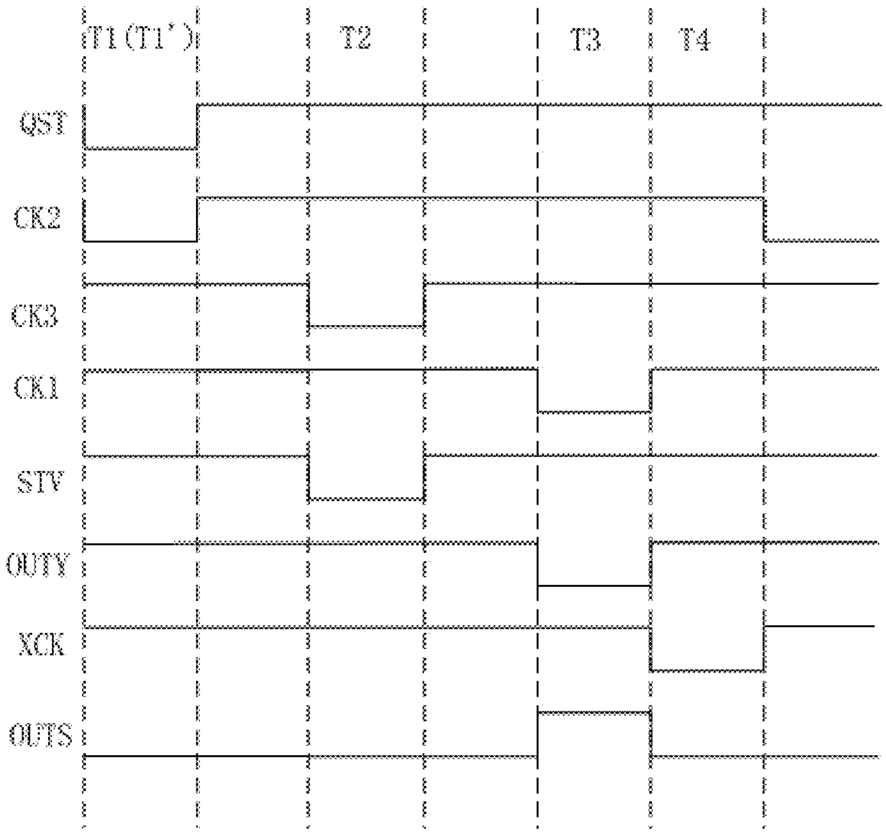
FIG. 11 illustrates a timing diagram consistent with various embodiments of the present disclosure.

Based on a same inventive concept, one embodiment further provides a driving method for operating the drive circuit 100 described in any of the above embodiments. FIG. 11 illustrates a timing diagram consistent with various embodiments of the present disclosure. In the embodiment, a driving cycle of the method includes four sequential phases: a reset phase T1, a start phase T2, an output phase T3, and an end phase T4, which are executed in order over time.

In the reset phase T1, the shift register sub-circuit 110 outputs the first level of the first level terminal VG1 in response to the effective level of the second control clock signal CK2, and the output sub-circuit 120 outputs the second level of the second level terminal. As shown in FIG. 11, the output signal of the shift register sub-circuit 110 is denoted as OUTY, and the output signal of the output sub-circuit 120 is denoted as OUTS.

In the turn-on phase T2, the shift register sub-circuit 110 outputs the ineffective level of the first control clock signal CK1 in response to the effective levels of the third control clock signal CK3 and the turn-on control signal STV. During the turn-on phase T2, the output sub-circuit 120 outputs the second level.

In the output phase T3, the shift register sub-circuit 110 outputs the effective level of the first control clock signal CK1, and the output sub-circuit 120 outputs the first level based on the effective level of the first control clock signal CK1 output by the shift register sub-circuit 110.

In the end phase T4, the shift register sub-circuit 110 outputs the ineffective level of the first control clock signal CK1, and the output sub-circuit 120 outputs the second level based on the effective level of the interval clock signal XCK.

Furthermore, in one embodiment, the drive circuit 100 may also include a scan reset module 115, and correspondingly a scan reset phase T1'. As shown in the timing sequence in FIG. 11, taking the effective level of the reset control signal QST and the effective level of the second control clock signal CK2 overlapping in time sequence in a driving cycle as an example, during the scan reset phase T1', the scan reset module 115 resets the drive circuit 100 based on the effective level of the reset control signal QST. Specifically, the scan reset module 115 sets the level of the first node N1 to the first level in response to the effective level of the reset control signal QST.

Specifically, the driving process of the drive circuit 100 will be described in more detail with reference to the drive circuit 100 shown in FIG. 10 and the timing diagram shown in FIG. 11. During the reset phase T1 (where the scan reset phase T1' shown in FIG. 11 overlaps with the reset phase T1), the reset control signal QST is at an effective level, turning on the eleventh transistor M11. The gate of the twelfth transistor M12 is connected to the second level of the second level terminal VG2 and remains in a normally-on state. The eleventh transistor M11 and the twelfth transistor M12 form a conduction path between the first level terminal VG1 and the first node N1. The second control clock signal CK2 is at an effective level, turning on the first transistor M1 and establishing a connection between the second level terminal VG2 and the second node N2. The second level of the second node N2 turns on the second transistor M2. Since the gate of the third transistor M3 is connected to the second level of the second level terminal VG2, the gate of the third transistor M3 remains in a normally-on state. The second transistor M2 and the third transistor M3 c establish a conduction path between the first level terminal VG1 and the first node N1. Simultaneously, the second level at the second node N2 also turns on the fourth transistor M4, which connects the first level terminal VG1 to the output terminal of the shift register sub-circuit 110. As a result, the shift register sub-circuit 110 outputs the first level, represented by OUTY. Additionally, the second capacitor C2, charged by the storage voltage, maintains the conduction state of the sixteenth transistor M16 and the eighteenth transistor M18. The eighteenth transistor M18 transmits the second level from the second level terminal VG2 to the gate of the nineteenth transistor M19, thereby turning on the nineteenth transistor M19 and establishing a conduction path between the second level terminal VG2 and the output terminal of the output sub-circuit 120. As a result, the output sub-circuit 120 outputs the second level, represented by OUTS. During the turn-on phase T2, the third control clock signal CK3 and the turn-on control signal STV are at effective levels, thereby turning on the fifth transistor M5, the sixth transistor M6, and the eighth transistor M8. Since the gate of the ninth transistor M9 is connected to the second level terminal VG2, the ninth transistor M9 remains in a normally-on state. The fifth transistor M5, the sixth transistor M6 and the ninth transistor M9 connect the second level terminal VG2 to the first node N1, while the eighth transistor M8 connects the first level terminal VG1 to the second node N2. The second level at the first node N1 turns on both the seventh transistor M7 and the tenth transistor M10. The seventh transistor M7 establishes a conduction path between the first level terminal VG1 and the second node N2, while the tenth transistor M10 transmits the first control clock signal CK1 to the output terminal of the shift register sub-circuit 110. OUTY indicates that the shift register sub-circuit 110 outputs the ineffective level of the first control clock signal CK1. Meanwhile, the second capacitor C2, governed by a storage voltage, maintains the conduction of both the sixteenth transistor M16 and the eighteenth transistor M18. The eighteenth transistor M18 transmits the second level of the second level terminal VG2 to the gate of the nineteenth transistor M19, thereby turning on the nineteenth transistor M19 and connecting the second level terminal VG2 to the output terminal of the output sub-circuit 120. Consequently, OUTS indicates that the output sub-circuit 120 outputs the second level.

In the output phase T3, the first control clock signal CK1 is at an effective level. The first capacitor C1 maintains a conduction state of the tenth transistor M10. The tenth transistor M10 transmits the first control clock signal CK1 to the output terminal of the shift register sub-circuit 110. OUTY indicates that the shift register sub-circuit 110 outputs the effective level of the first control clock signal CK1, which is in phase with the second level. The effective level of the first control clock signal CK1 output by the shift register sub-circuit 110 controls a conduction of the thirteenth transistor M13, the fourteenth transistor M14 and the fifteenth transistor M15. The thirteenth transistor M13 transmits the first level of the first level terminal VG1 to the gate of the nine transistor M19, thereby turning off the nineteenth transistor M19. The fourteenth transistor M14 and the fifteenth transistor M15 connect the first level terminal VG1 to the output terminal of the output sub-circuit 120. OUTS indicates that the output sub-circuit 120 outputs the first level.

In the end phase T4, the first control clock signal CK1 is at an ineffective level. The first capacitor C1 maintains a conduction state of the tenth transistor M10. The tenth transistor M10 transmits the first control clock signal CK1 to the output terminal of the shift register sub-circuit 110. OUTY indicates that the output of the shift register sub-circuit 110 outputs the ineffective level of the first control clock signal CK1. When the interval clock signal XCK is at an effective level, the seventeenth transistor M17 is controlled to turn on. The seventeenth transistor M17 transmits the second level of the second level terminal VG2 to the gate of the nineteenth transistor M19, thereby turning on the nineteenth transistor M19. The nineteenth transistor M19 connects the second level terminal VG2 to the output terminal of the output sub-circuit 120. OUTS indicates that the output sub-circuit 120 outputs the second level.

Figure 12:
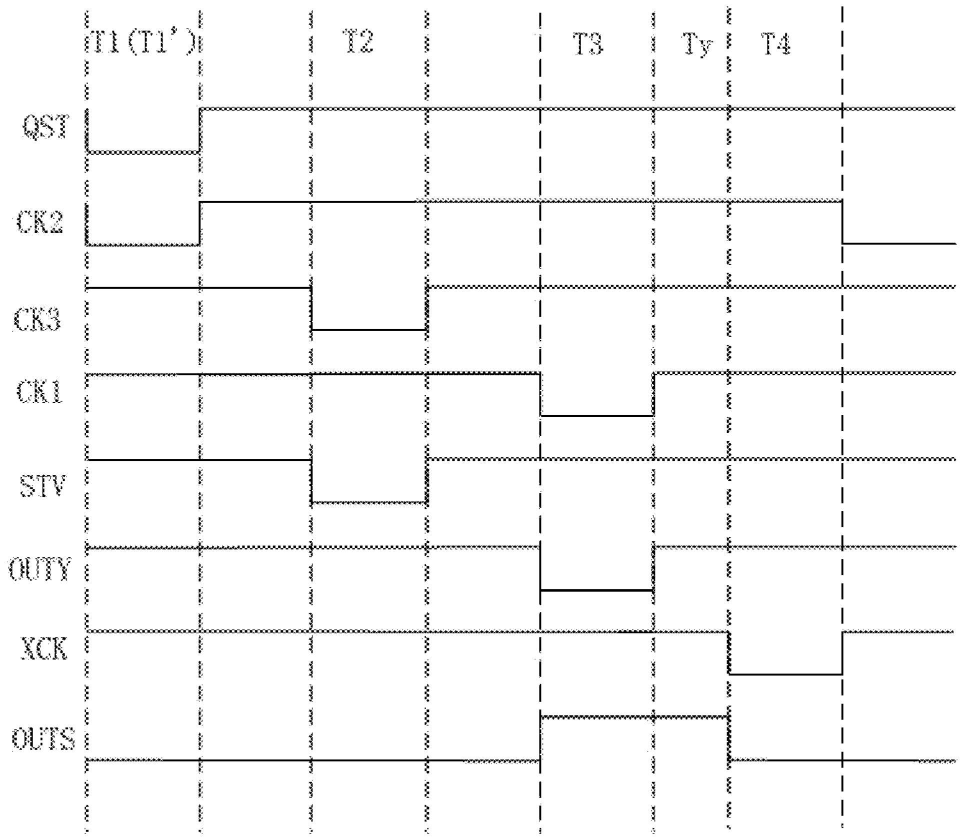
FIG. 12 illustrates another timing diagram consistent with various embodiments of the present disclosure.

FIG. 12 illustrates another timing diagram consistent with various embodiments of the present disclosure. Within a driving cycle of the drive circuit, there is a preset time interval Ty between the effective level of the first control clock signal CK1 and the effective level of the interval clock signal XCK. During the preset time interval Ty, the shift register sub-circuit 110 outputs the ineffective level of the first control clock signal CK1, while the output sub-circuit 120 continues to output the first level. Specifically, during the preset time interval Ty, the first control clock signal CK1 remains at an ineffective level. The first capacitor C1 maintains the conduction of the tenth transistor M10. The tenth transistor M10 transmits the first control clock signal CK1 to the output terminal of the shift register sub-circuit 110. OUTY indicates that the shift register sub-circuit 110 outputs the ineffective level of the first control clock signal CK1. The second capacitor C2 maintains the nineteenth transistor M19 in an off state, thereby keeping the output sub-circuit 120's output level at the first level. Therefore, the drive circuit 100 can perform phase conversion control by converting the effective level of the first control clock signal CK1 output by the shift register sub-circuit 110 into the first level output by the output sub-circuit 120. The drive circuit 100 achieves the third phase output by the output sub-circuit 120 under a control of the interval clock signal XCK. By optimizing the interval clock signal XCK, the drive circuit 100 enables adjustable pulse width for the first level output by the output sub-circuit 120, as well as adjustable timing intervals between the first level outputs of adjacent drive circuits 100 in a scanning circuit.

Figure 13:
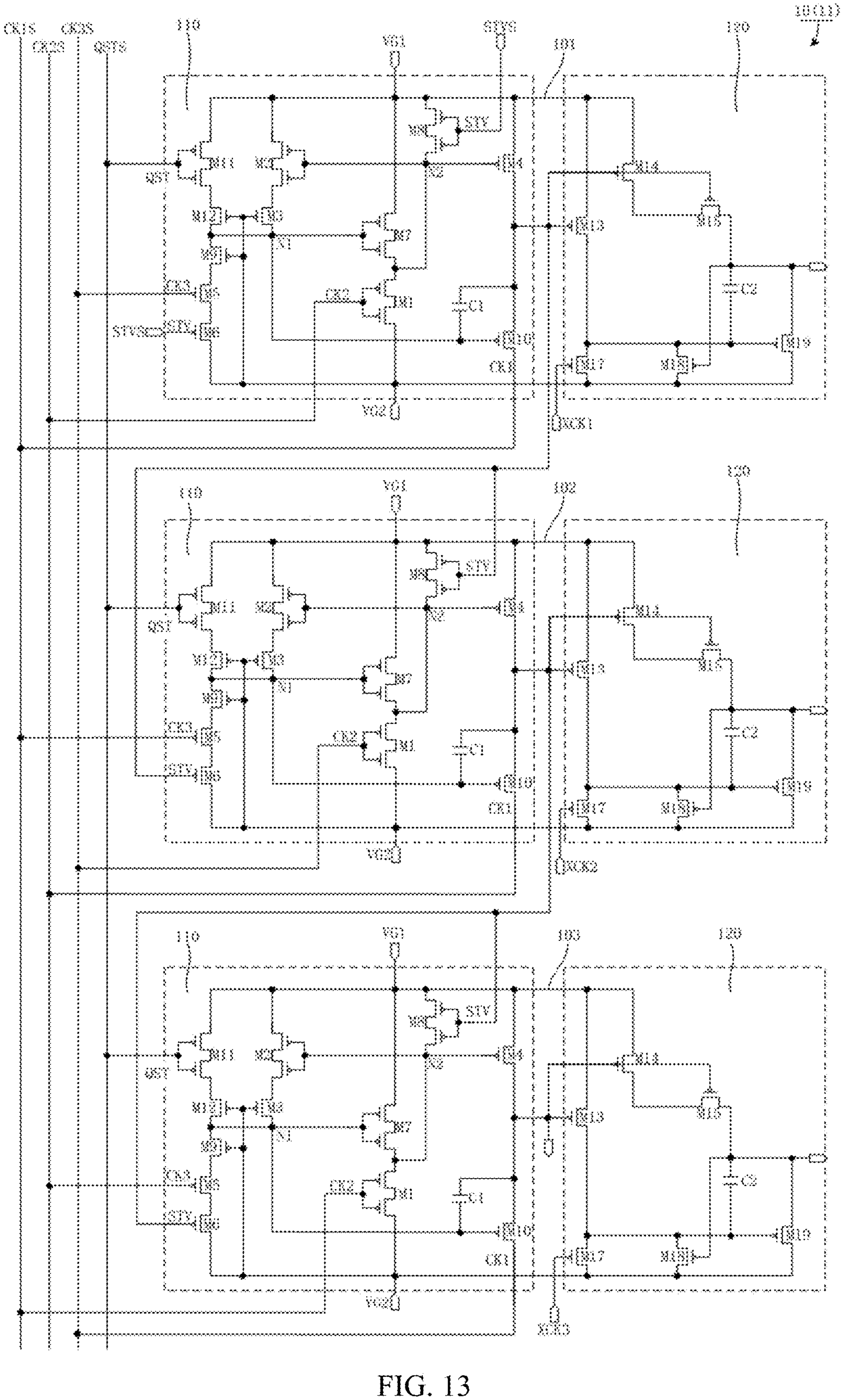
FIG. 13 illustrates a circuit diagram of a scanning circuit consistent with various embodiments of the present disclosure.

Based on a same inventive concept, one embodiment further provides a scanning circuit 10. The scanning circuit 10 includes a plurality of cascaded drive circuits 100 as described in any of the above embodiments. FIG. 13 illustrates a circuit diagram of a scanning circuit consistent with various embodiments of the present disclosure, specifically showing a circuit diagram of a repeating unit 11. In one embodiment, the scanning circuit 10 includes: a turn-on control signal line STVS; a first clock signal line CK1S; a second clock signal line CK2S; a third clock signal line CK3S; a first interval clock signal line XCK1S; a second interval clock signal line XCK2S; a third interval clock signal line XCK3S and at least one repeating circuit unit 11.

The second clock signal line CK2S, the third clock signal line CK3S and the first clock signal line CK1S sequentially output effective levels in time sequence. An i-th interval clock signal line outputs an effective level after the i-th clock signal line outputs an effective level, i is a positive integer not greater than 3. That is, in a driving cycle of the drive circuit 100, a clock control signal provided by the clock signal line causes the second control clock signal CK2 connected to the drive circuit 100 to be at an effective level, followed by the third control clock signal CK3, and finally the first control clock signal CK1. In a cycle of the repeating unit 11, the interval clock signal XCK output by the first interval clock signal line XCK1S is at an effective level, followed by the interval clock signal XCK output by the second interval clock signal line XCK2S, and finally the interval clock signal XCK output by the third interval clock signal line XCK3S.

The repeating unit 11 includes three of the drive circuits 100 connected in cascade, defined as a first drive circuit 101, a second drive circuit 102 and a third drive circuit 103 connected sequentially. In the first drive circuit 101, the first control terminal of the shift register sub-circuit 110 is electrically connected to the first clock signal line CK1S; the second control terminal of the shift register sub-circuit 110 is electrically connected to the second clock signal line CK2S; the third control terminal of the shift register sub-circuit 110 is electrically connected to the third clock signal line CK3S; and the second control terminal of the output sub-circuit 120 is electrically connected to the first interval clock signal line XCK1S. That is, the first clock signal line CK1S provides the first control clock signal CK1 to the first drive circuit 101; the second clock signal line CK2S provides the second control clock signal CK2 to the first drive circuit 101; the third clock signal line CK3S provides the third control clock signal CK3 to the first drive circuit 101; and the first interval clock signal line XCK1S provides the interval clock signal XCK to the first drive circuit 101.

In the second drive circuit 102, the first control terminal of the shift register sub-circuit 110 is electrically connected to the second clock signal line CK2S, the second control terminal of the shift register sub-circuit 110 is electrically connected to the third clock signal line CK3S, the third control terminal of the shift register sub-circuit 110 is electrically connected to the first clock signal line CK1S, and the second control terminal of the output sub-circuit 120 is electrically connected to the second interval clock signal line XCK2S. That is, the second clock signal line CK2S provides the first control clock signal CK1 to the second drive circuit 102; the third clock signal line CK3S provides the second control clock signal CK2 to the second drive circuit 102; the first clock signal line CK1S provides the third control clock signal CK3 to the second drive circuit 102; and the second interval clock signal line XCK2S provides the interval clock signal XCK to the second drive circuit 102.

In the third drive circuit 103, the first control terminal of the shift register sub-circuit 110 is electrically connected to the third clock signal line CK3S, the second control terminal of the shift register sub-circuit 110 is electrically connected to the first clock signal line CK1S, the third control terminal of the shift register sub-circuit 110 is electrically connected to the second clock signal line CK2S, and the second control terminal of the output sub-circuit 120 is electrically connected to the third interval clock signal line XCK3S. That is, the third clock signal line CK3S provides the first control clock signal CK1 to the third drive circuit 103; the first clock signal line CK1S provides the second control clock signal CK2 to the third drive circuit 103; the second clock signal line CK2S provides the third control clock signal CK3 to the third drive circuit 103; and the third interval clock signal line XCK3S provides the interval clock signal XCK for the second drive circuit 103.

In all cascaded drive circuits 100, the turn-on control terminal of the shift register sub-circuit 110 in the first-phase drive circuit 100 is electrically connected to the turn-on control signal line STVS. The output terminal of the shift register sub-circuit 110 in an upstream drive circuit 100 is electrically connected to the turn-on control terminal of the shift register sub-circuit 110 in a subsequent drive circuit 100. When the first drive circuit 101 shown in FIG. 13 serves as a first-phase drive circuit 100, the first drive circuit 101 is electrically connected to the turn-on control signal line STVS, which provides the turn-on control signal STV for the first-phase drive circuit 100 (e.g., the first drive circuit 101). In the cascade from the first drive circuit 101 to the third drive circuit 103, the output terminal of the shift register sub-circuit 110 in the first drive circuit 101 provides the turn-on control signal STV to the second drive circuit 102, and the output terminal of the shift register sub-circuit 110 in the second drive circuit 102 provides the turn-on control signal STV to the third drive circuit 103.

As shown in FIG. 13, in one embodiment, the drive circuit 100 may further include a scan reset module 115. The scanning circuit 10 also includes a reset control signal line QSTS, which is electrically connected to gates of the eleventh transistors M11 of all the drive circuits 100 to provide the reset control signal QST to all the drive circuits 100.

Based on a same inventive concept, one embodiment further provides a scanning method applicable to the scanning circuit 10 described in any of the above embodiments. In the embodiment, the scanning method includes controlling the plurality of cascaded drive circuits 100 to output the first level sequentially. A time interval between outputs of the first level from two adjacent cascaded drive circuits 100 corresponds to the effective level duration of the interval clock signal XCK connected to a preceding phase drive circuit 100. Specifically, a scanning process of the scanning circuit 10 provided by the present embodiment will be described in detail with reference to the circuit diagram of the scanning circuit 10 shown in FIG. 13 and the timing diagram shown in FIG. 14. A scanning process of the repeating unit 11 in the scanning circuit 10 includes a first phase D1 through an eighth phase D8. Taking the first drive circuit 101 to the third drive circuit 103 shown in FIG. 13 as an example, which correspond respectively to the first-phase drive circuit 100 through the third-phase drive circuit 100 in the cascaded drive circuits, an explanation is provided by considering the effective level of the reset control signal QST overlapping with the reset phase T1 of the first-stage drive circuit 100.

In the First Phase D1:

The first phase D1 is equivalent to the scan reset phase T1' and the reset phase T1 of the first drive circuit 101. In the first drive circuit 101, the eleventh transistor M11 and the twelfth transistor M12 are turned on, connecting the first level terminal VG1 to the first node N1. Meanwhile, the first transistor M1 is turned on, connecting the second level terminal VG2 to the second node N2. The second level at the second node N2 controls the second transistor M2 to turn on. Additionally, since the gate of the third transistor M3 is connected to the second level terminal VG2, the third transistor M3 remains in a normally-on state. The second transistor M2 and the third transistor M3 connect the first level terminal VG1 to the first node N1. Simultaneously the second level at the second node N2 controls the fourth transistor M4 to turn on. The fourth transistor M4 connects the first level terminal VG1 to the output terminal of the shift register sub-circuit 110. OUTY1 indicates that the shift register sub-circuit 110 of the first drive circuit 101 outputs the first level. The second capacitor C2 maintains a storage voltage, sustaining a conduction of the sixteenth transistor M16 and the eighteenth transistor M18. The eighteenth transistor M18 transmits the second level of the second level terminal VG2 to the gate of the nineteenth transistor M19, controlling the nineteenth transistor M19 to turn on and thereby connecting the second level terminal VG2 to the output terminal of the output sub-circuit 120. OUTS1 indicates that the output sub-circuit 120 of the first drive circuit 101 outputs the second level.

In the Second Phase D2:

The second phase D2 is equivalent to the turn-on phase T2 of the first drive circuit 101 and the reset phase T1 of the second drive circuit 102. In the first drive circuit 101, the fifth transistor M5, the sixth transistor M6, and the eighth transistor M8 are turned on. Since the gate of the ninth transistor M9 is connected to the second level terminal VG2, it remains in a normally-on state. The fifth transistor M5, the sixth transistor M6, and the ninth transistor M9 connect the second level terminal VG2 to the first node N1, while the eighth transistor M8 connects the first level terminal VG1 to the second node N2. The second level at the first node N1 controls the seventh transistor M7 and the tenth transistor M10 to turn on. The seventh transistor M7 connects the first level terminal VG1 to the second node N2, while the tenth transistor M10 transmits the first control clock signal CK1 to the output terminal of the shift register sub-circuit 110. OUTY1 indicates that the shift register sub-circuit 110 of the first drive circuit 101 outputs the ineffective level of the first control clock signal CK1. Meanwhile, the second capacitor C2, controlled by a storage voltage, maintains a conduction of the sixteenth transistor M16 and the eighteenth transistor M18. The eighteenth transistor M18 transmits the second level from the second level terminal VG2 to the gate of the nineteenth transistor M19, thereby controlling the nineteenth transistor M19 to turn on and connecting the second level terminal VG2 to the output terminal of the output sub-circuit 120. OUTS1 indicates that the output sub-circuit 120 of the first drive circuit 101 outputs the second level.

In the second drive circuit 102, the eleventh transistor M11 and the twelfth transistor M12 are turned on, connecting the first level terminal VG1 to the first node N1. The first transistor M1 is turned on, connecting the second level terminal VG2 to the second node N2. The second level at the second node N2 controls the second transistor M2 to turn on. Since the gate of the third transistor M3 is connected to the second level terminal VG2 and is normally on, the second transistor M2 and the third transistor M3 connect the first level terminal VG1 to the first node N1. Simultaneously, the second level of the second node N2 controls the fourth transistor M4 to turn on, and the fourth transistor M4 connects the first level terminal VG1 to the output terminal of the shift register sub-circuit 110. OUTY2 indicates that the shift register sub-circuit 110 of the second drive circuit 102 outputs the first level. The second capacitor C2 is controlled by a storage voltage to maintain a conduction between the sixteenth transistor M16 and the eighteenth transistor M18. The eighteenth transistor M18 transmits the second level from the second level terminal VG2 to the gate of the nineteenth transistor M19, thereby turning on the nineteenth transistor M19 and connecting the second level terminal VG2 to the output terminal of the output sub-circuit 120. OUTS2 indicates that the output sub-circuit 120 of the second drive circuit 102 outputs the second level.

In the Third Phase D3:

The third phase D3 is equivalent to the output phase T3 of the first drive circuit 101, the turn-on phase T2 of the second drive circuit 102 and the reset phase T1 of the third drive circuit 103. In the first drive circuit 101, the first control clock signal CK1 is at an effective level. The first capacitor C1 maintains a conduction of the tenth transistor M10. The tenth transistor M10 transmits the first control clock signal CK1 to the output terminal of the shift register sub-circuit 110. OUTY1 indicates that the output of the shift register sub-circuit 110 of the first drive circuit 101 is the effective level of the first control clock signal CK1. The effective level of the first control clock signal CK1, output by the shift register sub-circuit 110, controls the thirteenth transistor M13, the fourteenth transistor M14, and the fifteenth transistor M15 to turn on. The thirteenth transistor M13 transmits the first level of the first level terminal VG1 to the gate of the nineteenth transistor M19, thereby controlling the nineteenth transistor M19 to turn off. The fourteenth transistor M14 and the fifteenth transistor M15 connect the first level terminal VG1 to the output terminal of the output sub-circuit 120. OUTS1 indicates that the output sub-circuit 120 of the first drive circuit 101 outputs the first level.

In the second drive circuit 102, the fifth transistor M5, the sixth transistor M6 and the eighth transistor M8 are turned on. Since the gate of the ninth transistor M9 is connected to the second level of the second level terminal VG2, the ninth transistor M9 remains in a normally-on state. The fifth transistor M5, the sixth transistor M6, and the ninth transistor M9 connect the second level terminal VG2 to the first node N1, and the eighth transistor M8 connects the first level terminal VG1 to the second node N2. The second level of the first node N1 controls the seventh transistor M7 and the tenth transistor M10 to turn on. The seventh transistor M7 connects the first level terminal VG1 to the second node N2, and the tenth transistor M10 transmits the first control clock signal CK1 to the output terminal of the shift register sub-circuit 110. OUTY2 indicates that the shift register sub-circuit 110 of the second drive circuit 102 outputs the ineffective level of the first control clock signal CK1. The second capacitor C2 is controlled by the storage voltage to maintain the conducting state of the sixteenth transistor M16 and the eighteenth transistor M18. The eighteenth transistor M18 transmits the second level of the second level terminal VG2 to the gate of the nineteenth transistor M19, thereby controlling the nineteenth transistor M19 to turn on and connecting the second level terminal VG2 to the output terminal of the output sub-circuit 120. OUTS2 indicates that the output sub-circuit 120 of the second drive circuit 102 outputs the second level.

In the third drive circuit 103, the eleventh transistor M11 and the twelfth transistor M12 are turned on, thereby connecting the first level terminal VG1 to the first node N1. The first transistor M1 is also turned on, connecting the second level terminal VG2 to the second node N2. The second level at the second node N2 controls the second transistor M2 to turn on. Since the gate of the third transistor M3 is connected to the second level of the second level terminal VG2, the third transistor M3 remains in a normally-on state. The second transistor M2 and the third transistor M3 together connect the first level terminal VG1 to the first node N1. Simultaneously, the second level at the second node N2 controls the fourth transistor M4 to turn on. The fourth transistor M4 connects the first level terminal VG1 to the output terminal of the shift register sub-circuit 110. OUTY3 indicates that the shift register sub-circuit 110 of the third drive circuit 103 outputs the first level. The second capacitor C2, controlled by the storage voltage, maintains the conducting state of the sixteenth transistor M16 and the eighteenth transistor M18. The eighteenth transistor M18 transmits the second level of the second level terminal VG2 to the gate of the nineteenth transistor M19, thereby controlling the nineteenth transistor M19 to turn on and connecting the second level terminal VG2 to the output terminal of the output sub-circuit 120. OUTS3 indicates that the output sub-circuit 120 of the third drive circuit 103 outputs the second level.

In the Fourth Phase D4:

The fourth phase D4 is equivalent to the end phase T4 of the first drive circuit 101. In the first drive circuit 101, the first control clock signal CK1 is at an ineffective level. The first capacitor C1 maintains a conducting state of the tenth transistor M10. The tenth transistor M10 transmits the first control clock signal CK1 to the output terminal of the shift register sub-circuit 110. OUTY1 indicates that the output of the shift register sub-circuit 110 of the first drive circuit 101 is the ineffective level of the first control clock signal CK1. The interval clock signal XCK is at an effective level and controls the seventeenth transistor M17 to turn on. The seventeenth transistor M17 transmits the second level of the second level terminal VG2 to the gate of the nineteenth transistor M19, thereby controlling the nineteenth transistor M19 to turn on. The nineteenth transistor M19 connects the second level terminal VG2 to the output terminal of the output sub-circuit 120. OUTS1 indicates that the output sub-circuit 120 of the first drive circuit 101 outputs the second level.

In the Fifth Phase D5:

The fifth phase D5 is equivalent to the output phase T3 of the second drive circuit 102 and the turn-on phase T2 of the third drive circuit 103. The output phase T3 of the second drive circuit 102 and the turn-on phase T2 of the third drive circuit 103 operate consistently with the output phase T3 and turn-on phase T2 of the first drive circuit 101, which are not repeated herein. For example, OUTS2 indicates that the output sub-circuit 120 of the second drive circuit 102 outputs the first level; OUTY2 indicates that the shift register sub-circuit 110 of the second drive circuit 102 outputs the effective level of the first control clock signal CK1. Additionally, OUTS3 indicates that the output sub-circuit 120 of the third drive circuit 103 outputs the second level; OUTY3 indicates that the shift register sub-circuit 110 of the third drive circuit 103 outputs the ineffective level of the first control clock signal CK1. A time interval between two adjacent cascaded drive circuits 100 outputting the first level includes the effective level duration of the interval clock signal XCK connected to the preceding drive circuit 100. For example, a time interval during which the first drive circuit 101 and the second drive circuit 102 output the first level includes an effective level duration of the interval clock signal XCK provided by the first interval clock signal line XCK1S to the first drive circuit 101.

In the Sixth Phase D6:

The sixth phase D6 is equivalent to the end phase T4 of the second drive circuit 102. The end phase T4 of the second drive circuit 102 operates consistently with the end phase T4 of the first drive circuit 101, and therefore, a detailed description is omitted herein. OUTY2 indicates that the shift register sub-circuit 110 of the second drive circuit 102 outputs the ineffective level of the first control clock signal CK1, and OUTS2 indicates that the output sub-circuit 120 of the second drive circuit 102 outputs the second level.

In the Seventh Phase D7:

The seventh phase D7 is equivalent to the output phase T3 of the third drive circuit 103. The output phase T3 of the third drive circuit 103 operates similarly to the output phase T3 of the first drive circuit 101 described above, and therefore, a detailed description is omitted herein. OUTS3 indicates that the output sub-circuit 120 of the third drive circuit 103 outputs the first level; OUTY3 indicates that the shift register sub-circuit 110 of the third drive circuit 103 outputs the effective level of the first control clock signal CK1. Accordingly, a time interval during which the second drive circuit 102 and the third drive circuit 103 output the first level includes the effective level duration of the interval clock signal XCK provided by the second interval clock signal line XCK2S to the second drive circuit 102.

In the Eighth Phase D8:

The eighth phase D8 is equivalent to the end phase T4 of the third drive circuit 103. The end phase T4 of the third drive circuit 103 follows the same operation process as the end phase T4 of the first drive circuit 101, and therefore, a detailed description is omitted herein. OUTY3 indicates that the shift register sub-circuit 110 of the third drive circuit 103 outputs the ineffective level of the first control clock signal CK1. OUTS3 indicates that the output sub-circuit 120 of the third drive circuit 103 outputs the second level.

Figure 14:
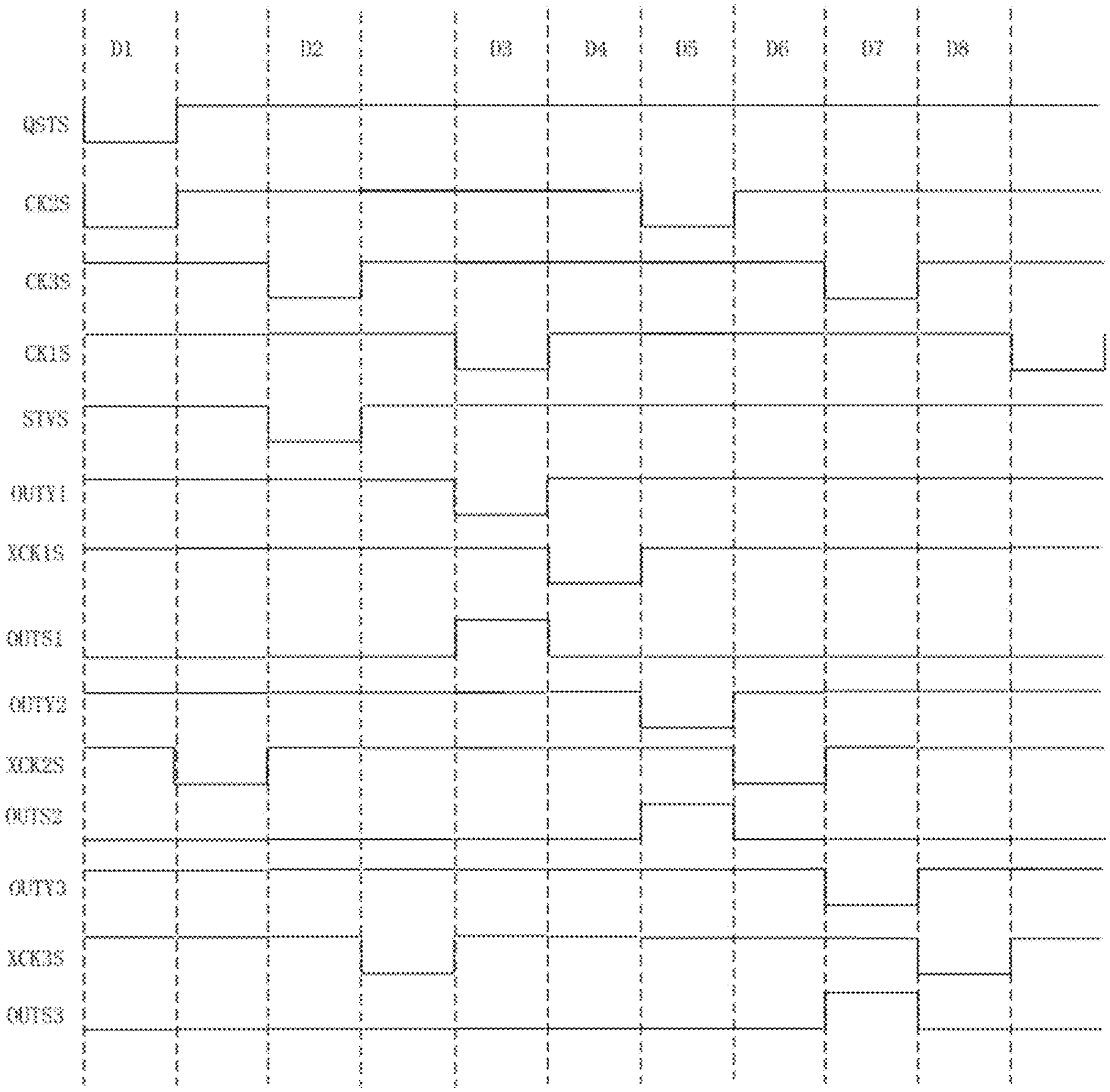
FIG. 14 illustrates another timing diagram consistent with various embodiments of the present disclosure.
Figure 15:
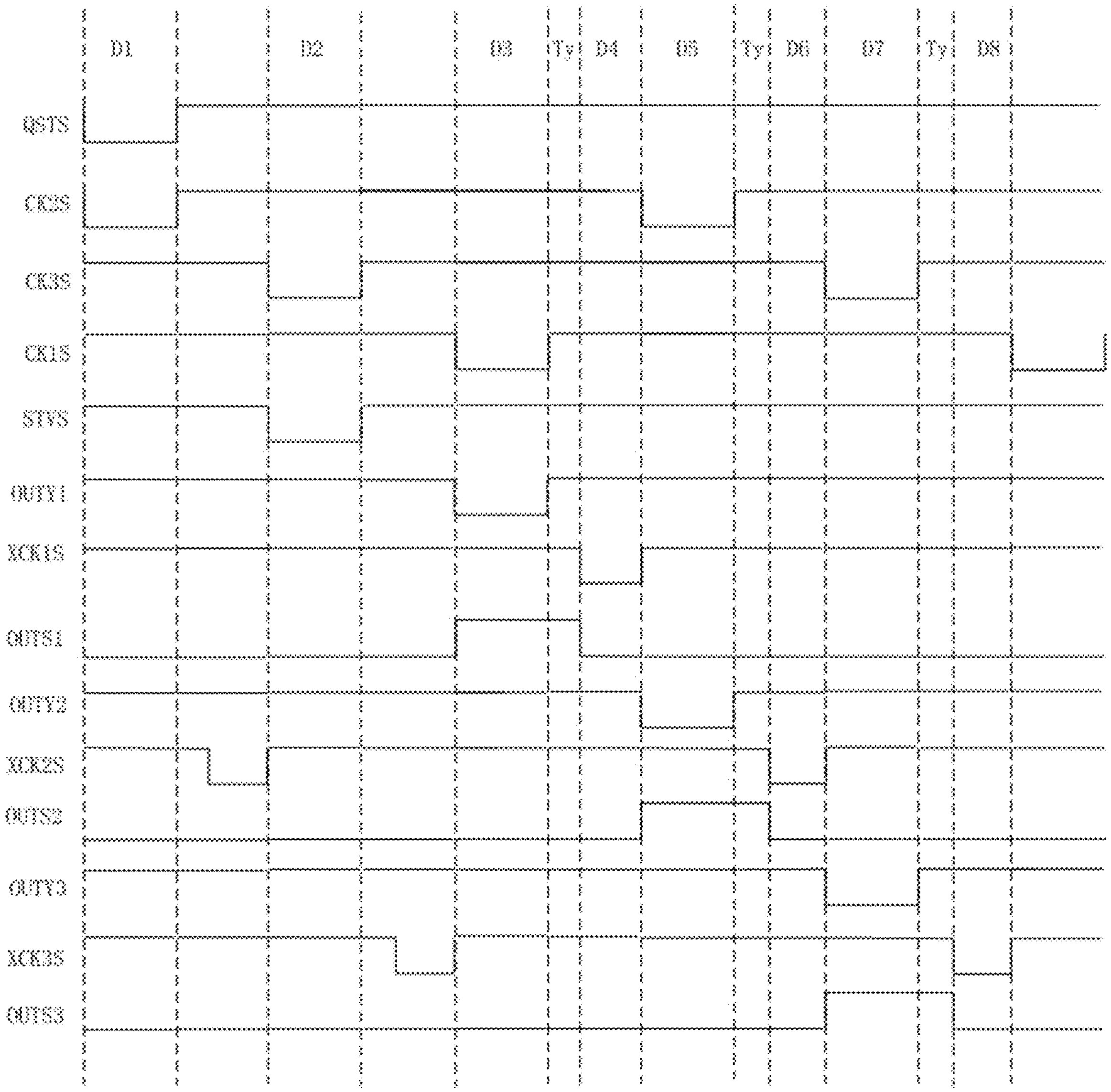
FIG. 15 illustrates another timing diagram consistent with various embodiments of the present disclosure.

FIG. 15 illustrates another timing diagram consistent with various embodiments of the present disclosure. Within a driving cycle of the drive circuit, the preset time interval Ty is defined between the effective level of the first control clock signal CK1 and the effective level of the interval clock signal. During this preset time interval Ty, the shift register sub-circuit 110 outputs an ineffective level of the first control clock signal CK1, while the output sub-circuit 120 continues to output the first level. A time interval during which the output sub-circuit 120 of two adjacent drive circuits 100 outputs the first level includes a first time interval tx1, defined as the time between an end of the effective level of the first control clock signal CK1 applied to an upper-level drive circuit 100 and a start of the effective level of the first control clock signal CK1 applied to a next-level drive circuit 100, minus the preset time interval Ty. That is, the time interval equals (tx1−tx2), where tx2 is the preset time interval Ty. As illustrated in FIG. 14 and FIG. 15, in the first drive circuit 101, the effective level of the first control clock signal CK1 provided by the first clock signal line CK1S and the effective level of the interval clock signal provided by the first interval clock signal line XCK1S are separated by the preset time interval Ty. In the preset time interval Ty between the third phase D3 and the fourth phase D4, the first clock signal line CK1S is an ineffective level. The first capacitor C1 maintains the control of the tenth transistor M10 to be turned on. The tenth transistor M10 transmits an ineffective level provided by the first clock signal line CK1S to the output terminal of the shift register sub-circuit 110. OUTY1 indicates that the shift register sub-circuit 110 of the first drive circuit 101 outputs the ineffective level of the first clock signal CK1S. During this period, the second capacitor C2 maintains the gate control of the nineteenth transistor M19 in an off state, thereby maintaining the output level of the output sub-circuit 120 at the first level. OUTS1 indicates that the output sub-circuit 120 of the first drive circuit 101 outputs the first level. Similarly, in the second drive circuit 102, during the preset time interval Ty between the fifth phase D5 and the sixth phase D6, OUTY2 indicates that the shift register sub-circuit 110 of the second drive circuit 102 outputs an ineffective level of the second clock signal CK2S, and OUTS2 indicates that the output sub-circuit 120 of the second drive circuit 102 outputs the first level. In the third drive circuit 103, during the preset time interval Ty between the seventh phase D7 and the eighth phase D8, OUTY3 indicates that the shift register sub-circuit 110 of the third drive circuit 103 outputs an ineffective level of the third clock signal line CK3S. OUTS3 indicates that the output sub-circuit 120 of the third drive circuit 103 outputs the first level. It can be seen that the drive circuit 100 can implement phase conversion control from the effective level of the first control clock signal CK1 output by the shift register sub-circuit 110 to the first level output by the output sub-circuit 120. The drive circuit 100 can control the end time of the first level output by the output sub-circuit 120 based on the interval clock signal XCK. By optimizing the interval clock signal XCK, the output sub-circuit 120 can adjust the pulse width of the first level and thereby regulate the time interval at which adjacent drive circuits 100 in the scanning circuit 10 output the first level.

Figure 16:
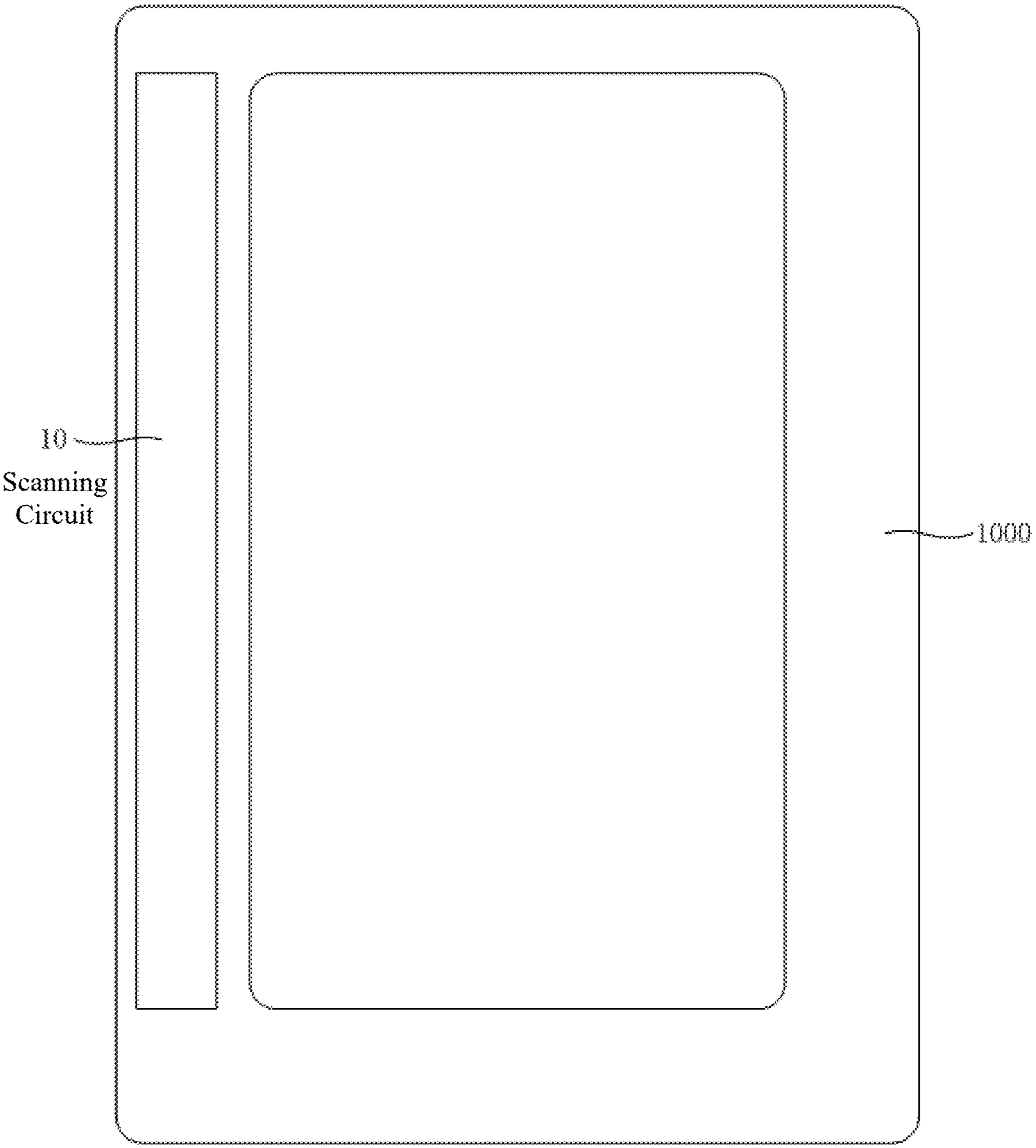
FIG. 16 illustrates a schematic diagram of a display device consistent with various embodiments of the present disclosure.
Figure 17:
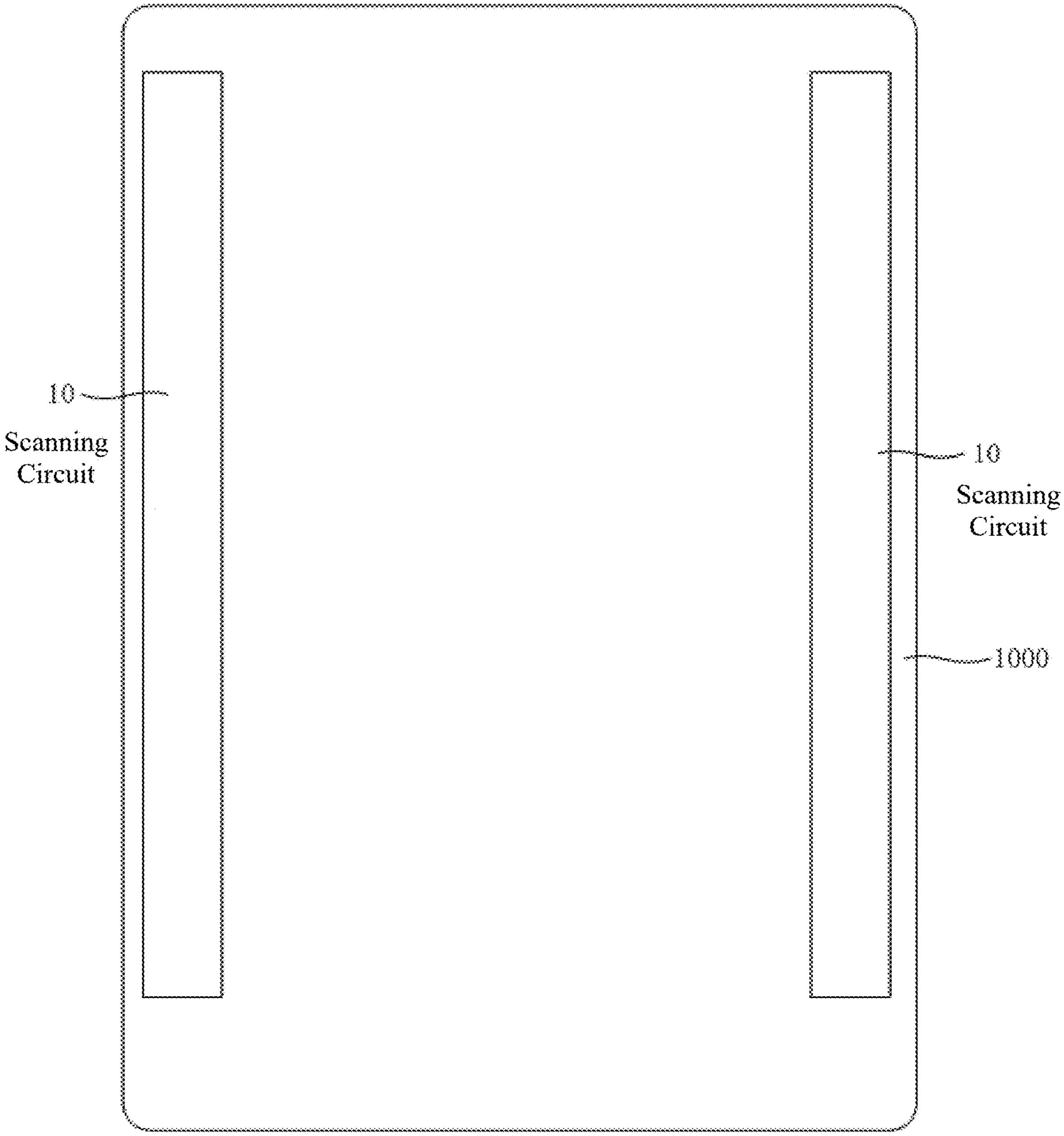
FIG. 17 illustrates a schematic diagram of another display device consistent with various embodiments of the present disclosure.

Based on a same inventive concept, one embodiment further provides a display device 1000. The display device 1000 includes the scanning circuit 10 as described in any of the above embodiments. FIG. 16 illustrates a schematic diagram of a display device consistent with various embodiments of the present disclosure. The display device 1000 includes the scanning circuit 10 described in any of the above embodiments. The scanning circuit 10 can be arranged on a side of the display device 1000. Alternatively, as illustrated in FIG. 17, scanning circuits 10 may be arranged on opposite sides of the display device 1000. The specific arrangement is not limited thereto.

Figure 18:
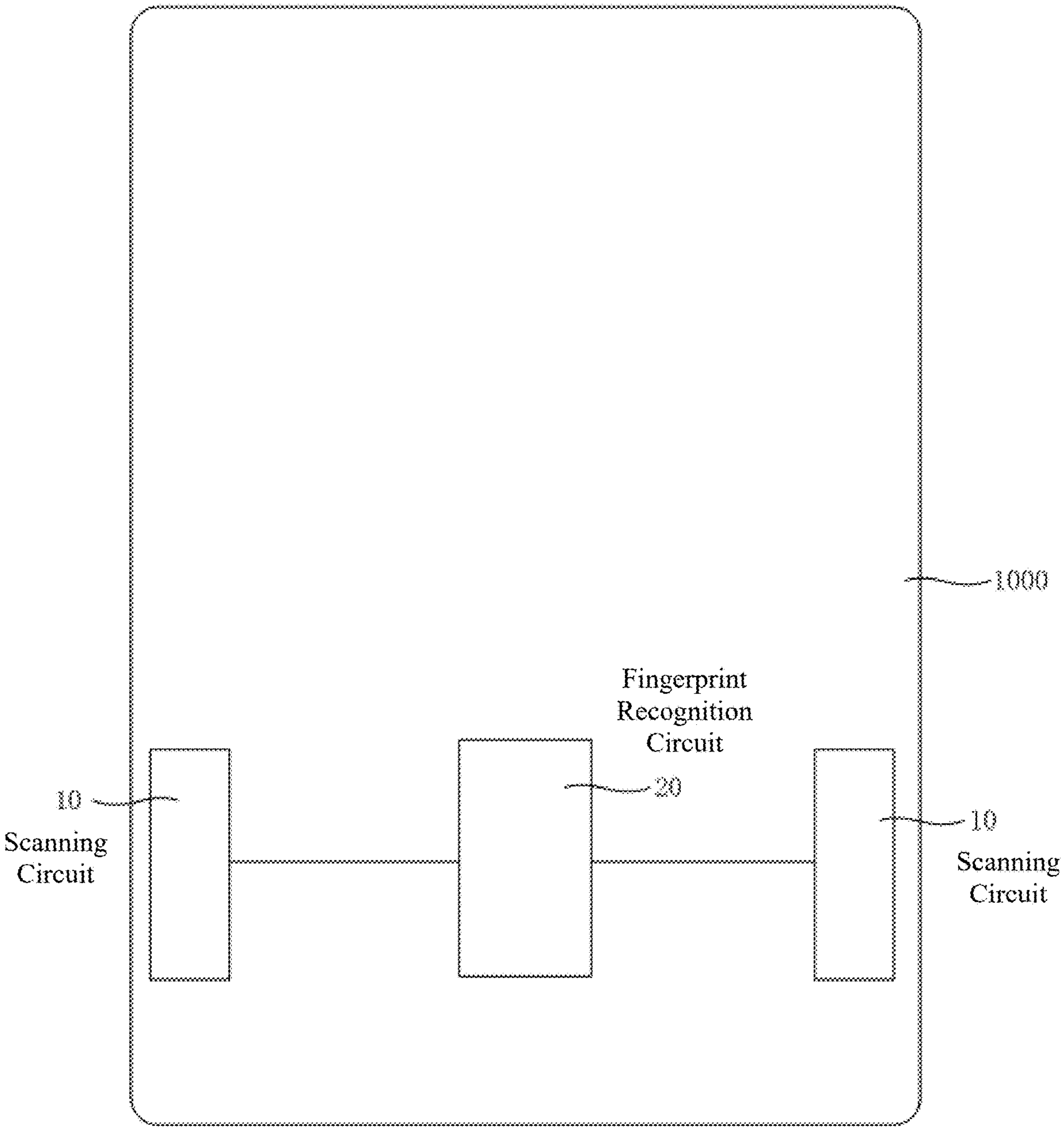
FIG. 18 illustrates a schematic diagram of another display device consistent with various embodiments of the present disclosure.

FIG. 18 illustrates a schematic diagram of another display device consistent with various embodiments of the present disclosure. In one embodiment, the display device 1000 includes a scanning circuit 10 and a fingerprint recognition circuit 20 electrically connected to the scanning circuit 10. The scanning circuit 10 may provide a corresponding scanning signal to the fingerprint recognition circuit 20. The fingerprint recognition circuit 20 may include a plurality of rows of circuit modules, each of which may be electrically connected to a first-level drive circuit 100 within the scanning circuit 10. The above configuration is consistent with conventional connection methods and will not be further detailed herein. Additionally, in other embodiments, the scanning circuit 10 may also be used to provide scanning signals to other applicable circuits, which are not specifically limited herein.

In some embodiments, the display device 1000 can be a large or small device, such as a mobile terminal, notebook, tablet, computer, wearable device, or the like, which is not specifically limited herein.

In summary, the embodiments of the present application provide a drive circuit and method, a scanning circuit and method, and a display device. The drive circuit includes a shift register sub-circuit and an output sub-circuit. The first control terminal of the output sub-circuit is electrically connected to the output terminal of the shift register sub-circuit. The second control terminal of the output sub-circuit is connected to an interval clock signal. The first input terminal of the output sub-circuit is electrically connected to the first level terminal. The second input terminal of the output sub-circuit is electrically connected to the second level terminal. The output sub-circuit outputs the first level based on the effective level of the first control clock signal output by the shift register sub-circuit, and outputs the second level of the second level terminal based on the effective level of the interval clock signal. The drive circuit realizes the phase conversion control from the effective level of the first control clock signal output by the shift register sub-circuit to the first level output by the output sub-circuit, and controls a duration of the first level output by the output sub-circuit based on an interval clock signal. Therefore, by optimizing the interval clock signal, the pulse width of the output sub-circuit outputting the first level can be adjusted, thereby enabling adjustable timing intervals for adjacent output sub-circuits in the scanning circuit to output the first level. Furthermore, the technical solution provided herein improves upon the shift register sub-circuit by adding an output sub-circuit connected to the output of the shift register sub-circuit, enabling relevant functions of the drive circuit to be realized while reducing a design complexity of the drive circuit.

In the description of the embodiments of the present application, it should be understood that terms such as "center", "longitudinal", "transverse", "length", "width", "thickness", "upper", "lower", "front", "back", "left", "right", "vertical", "horizontal", "top", "bottom", "inner", "outer", "clockwise", "counterclockwise" and orientations or positional relationships such as "axial," "radial," and "circumferential" are based on the orientations or positional relationships shown in the accompanying drawings. The terms are provided only for convenience of description and to simplify the disclosure. The terms do not imply or require that a device or element must have a specific orientation, nor should they be construed as limiting the scope of the present disclosure.

In addition, if terms "first" and "second" are used, the terms are intended solely for descriptive purposes and should not be construed as indicating or implying relative importance or the quantity of the referenced technical features. Accordingly, features designated as "first" and "second" may each refer to one or more such features. Furthermore, in the description of the embodiments of the present application, the term "plurality" means at least two, for example, two, three, or more, unless expressly stated otherwise.

In the embodiments of the present disclosure, unless otherwise clearly stated or limited, terms such as "installed," "connected," "coupled," "fixed," and similar expressions should be interpreted broadly. For example, the terms may refer to fixed connections, detachable connections, or integrated connections; mechanical or electrical connections; or connections that allow communication between components. The terms may be direct connections or indirect connections through one or more intermediate media and may refer to internal connections or interactions between components. Unless otherwise explicitly defined, a person skilled in the art will understand the specific meaning of the terms based on the context in which the terms are used.

In the embodiments of the present disclosure, unless otherwise explicitly stated and limited, a first feature being "above" or "below" a second feature may refer to either direct contact or indirect contact between the first and second features through an intermediate medium. Furthermore, the terms "above", "over" and "on top of" the second feature may indicate that the first feature is directly or diagonally above the second feature or simply positioned at a higher level. Similarly, the terms "below," "under," or "beneath the second feature may mean that the first feature is directly or diagonally below the second feature, or simply positioned at a lower level.

In the embodiments of the present disclosure, when terms such as "one embodiment," "some embodiments," "examples," "specific examples," or "some examples" are used, the terms indicate that features, structures, materials, or characteristics described in connection with an embodiment or example are included in at least one embodiment or example of the present disclosure. In the present specification, schematic expressions of the above terms are not necessarily limited to a same embodiment or example. Furthermore, specific features, structures, materials or characteristics described herein may be combined in any suitable manner in one or more embodiments or examples. A person skilled in the art may also combine different embodiments or examples, as well as features thereof, unless such combinations are inconsistent with one another.

As disclosed, the drive circuit and method, the scanning circuit and method, and the display device provided by the present disclosure at least realize the following beneficial effects.

The driving circuit includes a shift register sub-circuit and an output sub-circuit. A first control terminal of the output sub-circuit is electrically connected to an output terminal of the shift register sub-circuit while a second control terminal of the output sub-circuit is connected to an interval clock signal. A first input terminal of the output sub-circuit is electrically connected to a first level terminal, and a second input terminal is electrically connected to a second level terminal. The output sub-circuit outputs a first level based on an effective level of the first control clock signal from the shift register sub-circuit, and outputs a second level from the second level terminal based on an effective level of the interval clock signal. The drive circuit provided by the present disclosure enables phase conversion control by converting the effective level of the first control clock signal, output by the shift register sub-circuit, into the first level output by the output sub-circuit. The drive circuit further enables control of a termination time of a first level output based on the interval clock signal. Accordingly, by optimizing the interval clock signal, a pulse width of the first level output by the output sub-circuit can be adjusted, and a timing between adjacent drive circuits in the scanning circuit can be controlled to regulate an output of the first level. Furthermore, the technical solution of the present disclosure enhances the existing shift register sub-circuit design by introducing an output sub-circuit connected to an output of the shift register sub-circuit. The above configuration not only enables desired drive circuit functions but also simplifies an overall circuit design process.

Although the embodiments of the present disclosure have been described above, the embodiments are provided for illustrative purposes only and should not be construed as limiting the scope of the present disclosure. A person skilled in the art may make changes, modifications, substitutions, or adjustments to the described embodiments without departing from the scope of the present disclosure.

What is claimed is:

1. A drive circuit, comprising:

a shift register sub-circuit, including:
- a first control terminal connected to a first control clock signal,
- a second control terminal connected to a second control clock signal,
- a third control terminal connected to a third control clock signal,
- an opening control terminal connected to an opening control signal,
- a first input terminal electrically connected to a first level terminal,
- a second input terminal electrically connected to a second level terminal, and
- the shift register sub-circuit being configured to:
  - output a first level from the first level terminal based on an effective level of the second control clock signal,
  - output an ineffective level of the first control clock signal based on effective levels of the third control clock signal and a turn-on control signal,
  - subsequently output an effective level of the first control clock signal, and
  - a phase of the first level and a phase of the second level from the second level terminal being opposite, a phase of the effective level of the first control clock signal being identical to the phase of the second level;

an output sub-circuit, including:
- a first control terminal electrically connected to an output terminal of the shift register sub-circuit,
- a second control terminal connected to an interval clock signal,
- a first input terminal electrically connected to the first level terminal,
- a second input terminal electrically connected to the second level terminal, and the output sub-circuit being configured to:

output the first level based on the effective level of the first control clock signal output by the shift register sub-circuit, and output the second level based on an effective level of the interval clock signal; and effective levels of the second control clock signal, the third control clock signal, the first control clock signal, and the interval control clock signal being arranged sequentially in time sequence within a driving cycle of the drive circuit.

2. The drive circuit according to claim 1, wherein, within a driving cycle of the drive circuit, a preset time interval exists between the effective level of the first control clock signal and the effective level of the interval clock signal.

3. The drive circuit according to claim 1, wherein:

the shift register sub-circuit includes a circuit reset module, a turn-on module, a first output module, and a second output module, output terminals of the first output module and the second output module serve as output terminals of the shift register sub-circuit;

the circuit reset module is connected to the second control clock signal and is electrically connected to the first level terminal and the second level terminal, the circuit reset module controls a level of the first node to be the first level and a level of the second node to be the second level based on the effective level of the second control clock signal;

the second output module is electrically connected to the first level terminal and the second node, the second output module outputs the first level based on the second level of the second node;

the turn-on module is connected to the third control clock signal and the turn-on control signal, and is electrically connected to the first level terminal and the second level terminal, the turn-on module controls the level of the first node to be the second level, and controls the level of the second node to be the first level based on the effective levels of the third control clock signal and the turn-on control signal; and the first output module is connected to the first control clock signal and is electrically connected to the first node, the first output module outputs the ineffective level of the first control clock signal based on the second level of the first node, and outputs the effective level of the first control clock signal.

4. The drive circuit according to claim 3, wherein the circuit reset module includes a first transistor and a second transistor;

a first terminal of the first transistor is electrically connected to the second level terminal, a second terminal of the first transistor is electrically connected to the second node, and a gate of the first transistor is connected to the second control clock signal; and a first terminal of the second transistor is electrically connected to the first level terminal, a second terminal of the second transistor is electrically connected to the first node, and a gate of the second transistor is electrically connected to the second node.

5. The drive circuit according to claim 4, wherein:

the circuit reset module further includes a third transistor connected in series between the second transistor and the first node; and a first terminal of the third transistor is electrically connected to the second terminal of the second transistor, a second terminal of the third transistor is electrically connected to the first node, and the gate of the third transistor is electrically connected to the second level terminal.

6. The drive circuit according to claim 3, wherein:

the second output module includes a fourth transistor; and a first terminal of the fourth transistor is electrically connected to the first level terminal, a second terminal of the fourth transistor serves as an output terminal of the second output module, and a gate of the fourth transistor is electrically connected to the second node.

7. The drive circuit according to claim 3, wherein:

the turn-on module includes a fifth transistor, a sixth transistor, a seventh transistor and an eighth transistor;

a first terminal of the fifth transistor is electrically connected to the second terminal of the sixth transistor, a second terminal of the fifth transistor is electrically connected to the first node, and a gate of the fifth transistor is connected to the third control clock signal;

a first terminal of the sixth transistor is electrically connected to the second level terminal, and a gate of the sixth transistor is connected to the turn-on control signal;

a first terminal of the seventh transistor is electrically connected to the first level terminal, a second terminal of the seventh transistor is electrically connected to the second node, and a gate of the seventh transistor is electrically connected to the first node; and a first terminal of the eighth transistor is electrically connected to the first level terminal, a second terminal of the eighth transistor is electrically connected to the second node, and a gate of the eighth transistor is connected to the turn-on control signal.

8. The drive circuit according to claim 7, wherein:

the turn-on module further includes a ninth transistor connected in series between the fifth transistor and the first node; and a first terminal of the ninth transistor is electrically connected to the second terminal of the fifth transistor, a second terminal of the ninth transistor is electrically connected to the first node, and a gate of the ninth transistor is electrically connected to the second level terminal.

9. The drive circuit according to claim 3, wherein:

the first output module includes a tenth transistor and a first capacitor;

a first terminal of the tenth transistor is connected to the first control clock signal, a second terminal of the tenth transistor serves as an output terminal of the first output module, and a gate of the tenth transistor is electrically connected to the first node; and a first plate of the first capacitor is electrically connected to the gate of the tenth transistor, a second plate of the first capacitor is electrically connected to the second terminal of the tenth transistor.

10. The drive circuit according to claim 3, wherein:

the shift register sub-circuit further includes: a scan reset module, which is connected to a reset control signal and is electrically connected to the first level terminal; and the scan reset module controls the level of the first node to be the first level based on an effective level of the reset control signal.

11. The drive circuit according to claim 10, wherein, in a driving cycle of the drive circuit:

the effective level of the reset control signal occurs before the effective level of the second control clock signal; or a starting time of the effective level of the reset control signal is earlier than a starting time of the effective level of the second control clock signal, and the effective level of the reset control signal partially overlaps the effective level of the second control clock signal in time sequence; or the effective level of the reset control signal overlaps the effective level of the second control clock signal in time sequence.

12. The drive circuit according to claim 10, wherein:

the scan reset module includes an eleventh transistor; and a first terminal of the eleventh transistor is electrically connected to the first level terminal, a second terminal of the eleventh transistor is electrically connected to the first node, and a gate of the eleventh transistor is connected to the reset control signal.

13. The drive circuit according to claim 12, wherein:

the scan reset module further includes a twelfth transistor connected in series between the eleventh transistor and the first node; and a first terminal of the twelfth transistor is electrically connected to the second terminal of the eleventh transistor, a second terminal of the twelfth transistor is electrically connected to the first node, and a gate of the twelfth transistor is electrically connected to the second level terminal.

14. The drive circuit according to claim 1, wherein:

the output sub-circuit includes a pull-up output module and a pull-down output module, output terminals of the pull-up output module and the pull-down output module serve as output terminals of the output sub-circuit;

the pull-up output module is electrically connected to the output terminal of the shift register sub-circuit and the first level terminal, the pull-up output module outputs the first level based on the effective level of the first control clock signal output by the shift register sub-circuit; and the pull-down output module is connected to the interval clock signal and is electrically connected to the second level terminal, the pull-down output module outputs the second level based on the effective level of the interval clock signal.

15. The drive circuit according to claim 14, wherein:

the pull-up output module includes a thirteenth transistor, a fourteenth transistor and a fifteenth transistor;

a first terminal of the thirteenth transistor is electrically connected to the first level terminal, a second terminal of the thirteenth transistor is electrically connected to the pull-down output module, and a gate of the thirteenth transistor is electrically connected to the output terminal of the shift register sub-circuit;

a first terminal of the fourteenth transistor is electrically connected to the first level terminal, a second terminal of the fourteenth transistor is electrically connected to the first terminal of the fifteenth transistor, and a gate of the fourteenth transistor is electrically connected to the output terminal of the shift register sub-circuit and a second terminal of the fifteenth transistor is the output terminal of the pull-up output module, and a gate of the fifteenth transistor is electrically connected to the output terminal of the shift register sub-circuit.

16. The drive circuit according to claim 15, wherein:

the pull-up output module further includes a sixteenth transistor; and a first terminal of the sixteenth transistor is electrically connected to the second terminal of the fourteenth transistor, a second terminal of the sixteenth transistor is electrically connected to the second level terminal, a gate of the sixteenth transistor is electrically connected to the second terminal of the fifteenth transistor.

17. The drive circuit according to claim 14, wherein:

the pull-down output module includes a seventeenth transistor, an eighteenth transistor, a nineteenth transistor and a second capacitor;

a first terminal of the seventeenth transistor is electrically connected to the second level terminal, a second terminal of the seventeenth transistor is electrically connected to a second terminal of the eighteenth transistor and to a gate of the nineteenth transistor, and a gate of the seventeenth transistor is connected to the interval clock signal;

a first terminal of the eighteenth transistor is electrically connected to the second level terminal, and a gate of the eighteenth transistor is electrically connected to a second terminal of the nineteenth transistor;

a first terminal of the nineteenth transistor is electrically connected to the second level terminal, and the second terminal of the nineteenth transistor serves as an output terminal of the pull-down output module; and a first plate of the second capacitor is electrically connected to the gate of the nineteenth transistor, and a second plate of the second capacitor is electrically connected to the second terminal of the nineteenth transistor.

18. A driving method for driving the drive circuit according to claim 1, wherein:

a driving cycle of the driving method includes, in time sequence, a reset phase, a start phase, an output phase and an end phase;

in the reset phase, the shift register sub-circuit outputs the first level from the first level terminal based on the effective level of the second control clock signal, and the output sub-circuit outputs the second level from the second level terminal;

in the turn-on phase, the shift register sub-circuit outputs the ineffective level of the first control clock signal based on the third control clock signal and the effective level of the turn-on control signal, and the output sub-circuit outputs the second level;

in the output phase, the shift register sub-circuit outputs the effective level of the first control clock signal, and the output sub-circuit outputs the first level based on the effective level of the first control clock signal output by the shift register sub-circuit; and in the end phase, the shift register sub-circuit outputs the ineffective level of the first control clock signal, and the output sub-circuit outputs the second level based on the effective level of the interval clock signal.

19. The driving method according to claim 18, wherein:

within a driving cycle of the drive circuit, a preset time interval exists between an effective level of the first control clock signal and an effective level of the interval clock signal; and the shift register sub-circuit outputs an ineffective level of the first control clock signal, and the output sub-circuit continues to output the first level.

20. A scanning circuit, comprising a plurality of cascaded drive circuits according to claim 1.

21. The scanning circuit according to claim 20, further comprising an opening control signal line, a first clock signal line, a second clock signal line, a third clock signal line, a first interval clock signal line, a second interval clock signal line, a third interval clock signal line and at least one repeating circuit unit, wherein:

the second clock signal line, the third clock signal line, and the first clock signal line sequentially output effective levels in a time sequence, and an i-th interval clock signal line outputs an effective level after an effective level is output by an i-th clock signal line, where i is a positive integer not greater than 3;

the repeating circuit unit includes three cascaded drive circuits defined as a first drive circuit, a second drive circuit, and a third drive circuit, arranged in sequential cascade;

in the first drive circuit, a first control terminal of the shift register sub-circuit is electrically connected to the first clock signal line, a second control terminal of the shift register sub-circuit is electrically connected to the second clock signal line, a third control terminal of the shift register sub-circuit is electrically connected to the third clock signal line, and a second control terminal of the output sub-circuit is electrically connected to the first interval clock signal line;

in the second drive circuit, the first control terminal of the shift register sub-circuit is electrically connected to the second clock signal line, the second control terminal of the shift register sub-circuit is electrically connected to the third clock signal line, the third control terminal of the shift register sub-circuit is electrically connected to the first clock signal line, and the second control terminal of the output sub-circuit is electrically connected to the second interval clock signal line;

in the third drive circuit, the first control terminal of the shift register sub-circuit is electrically connected to the third clock signal line, the second control terminal of the shift register sub-circuit is electrically connected to the first clock signal line, the third control terminal of the shift register sub-circuit is electrically connected to the second clock signal line, and the second control terminal of the output sub-circuit is electrically connected to the third interval clock signal line; and for all drive circuits in the cascade, a turn-on control terminal of the shift register sub-circuit of a first-phase drive circuit is electrically connected to a turn-on control signal line, and the output terminal of the shift register sub-circuit of each preceding-phase drive circuit is electrically connected to the turn-on control terminal of the shift register sub-circuit of a subsequent-phase drive circuit.

22. A scanning method used in the scanning circuit according to claim 20, comprising controlling a plurality of cascaded drive circuits to sequentially output a first level, wherein:

a time interval between outputs of the first level from two adjacent drive circuits includes an effective level duration of an interval clock signal connected to the drive circuit of a preceding phase.

23. The scanning method according to claim 22, wherein:

within a driving cycle of the drive circuit, a preset time interval exists between an effective level of the first control clock signal and an effective level of the interval clock signal; and during the preset time interval, the shift register sub-circuit outputs an ineffective level of the first control clock signal, and the output sub-circuit continues to output the first level.

24. A display device, comprising the scanning circuit according to claim 20.

* * * * *